United States Patent [19]

Kawamura et al.

[11] Patent Number: 5,046,094
[45] Date of Patent: Sep. 3, 1991

[54] SERVER-AIDED COMPUTATION METHOD AND DISTRIBUTED INFORMATION PROCESSING UNIT

[75] Inventors: Shinichi Kawamura; Atsushi Shimbo; Kyoto Takabayashi, all of Yokohama, Japan

[73] Assignee: Kabushiki Kaisha Toshiba, Kawasaki, Japan

[21] Appl. No.: 474,404

[22] Filed: Feb. 2, 1990

[30] Foreign Application Priority Data

| Feb. 2, 1989 | [JP] | Japan | 1-24723 |
| May 18, 1989 | [JP] | Japan | 1-122849 |
| May 31, 1989 | [JP] | Japan | 1-139593 |
| Jul. 20, 1989 | [JP] | Japan | 1-189677 |
| Sep. 21, 1989 | [JP] | Japan | 1-243349 |
| Dec. 15, 1989 | [JP] | Japan | 1-323926 |

[51] Int. Cl.$^5$ ............................................. H04L 9/02
[52] U.S. Cl. ...................................... 380/46; 380/28; 380/23
[58] Field of Search ................................. 380/23–25, 380/28, 30, 44, 46; 340/825.31, 825.34

[56] References Cited

U.S. PATENT DOCUMENTS

| 4,351,982 | 9/1982 | Miller et al. | 380/25 |
| 4,633,036 | 12/1986 | Hellman et al. | 380/25 |
| 4,797,920 | 1/1989 | Stein | 380/24 |
| 4,933,970 | 6/1990 | Shamir | 380/23 X |
| 4,969,189 | 11/1990 | Ohta et al. | 380/25 |

OTHER PUBLICATIONS

"A Method For Obtaining Digital Signatures and Public-Key Cryptosystems"; Ronald L. Rivest, Adi Shamir, Len Adleman; (Apr. 4, 1977).
"New Direction In Cryptography"; Whitfield Diffie, Martine E. Hellman; IEEE Transactions on Information Theory, vol. IT-22, No. 6, Nov. 1976.
"Smart Cards Can Compute Secret Heavy Functions with Powerful Terminals"; T. Matsumoto, K. Kato, H. Imai; The 10th Symposium on Information Theory and Its Applications, Nov. 19-21, 1987.
"Speeding Up Secret Computations with Insecure Auxiliary Devices"; T. Matsumoto, K. Kato, H. Imai; Pro. of Crypto '88, Aug. 21-25, 1988.
"On Using RSA With Low Exponent In A Publish Key Network"; J. Hastad, pp. 403-408.
"Fast Decipherment Algorithm For RSA Public-Key Cryptosystem"; Electronics Letter, Oct. 14, 1982, vol. 18, No. 21.
"How to Ask Services Without Violating Privacy"; T. Matsumoto, H. Imai; The 1989 Symposium on Cryptography and Information Security, Feb. 2-4, 1989.
"Computation Methods for RSA with the Aid of Powerful Terminals"; S. Kawamura, A. Shimbo; The 1989 Symposium on Cryptography and Information Security, Feb. 2-4, 1989.
"On Asking Advices with Privacy"; K. Kato, T. Matsumoto, H. Imai; 1988 Symposium on Cryptography & Information Security, Feb. 22-24, 1988.
"A Method for Obtaining Digital Signatures & Public-Key Cryptosystem", R. Rivest, A. Shamir, L. Adleman; Communications of the ACM, Feb. 1978, vol. 21, No. 2, pp. 120-126.
A Japanese Publication, pp. 18-19.

Primary Examiner—Thomas H. Tarcza
Assistant Examiner—Tod Swann
Attorney, Agent, or Firm—Oblon, Spivak, McClelland, Maier & Neustadt

[57] ABSTRACT

A server-aided computation method using a main unit for processing secret information and at least one auxiliary unit for supporting a computation that said main unit executes, said method comprising the steps of generating d' from a secret key d' using m random numbers $R_i$ (where i=1, ..., m) generated by said main unit having secret keys n and d, transferring d' and n from said main unit to said auxiliary unit, computing the following equation from a message block C in said auxiliary unit $$M' = C^{d'} \bmod n$$

computing X using said random numbers $R_i$ and n in said main unit while computing M' in said auxiliary unit, transferring M' from said auxiliary unit to said main unit, and computing a message block M using the following equation in said main unit.

$$M = M' \cdot X \bmod n$$

12 Claims, 21 Drawing Sheets

F I G. 10
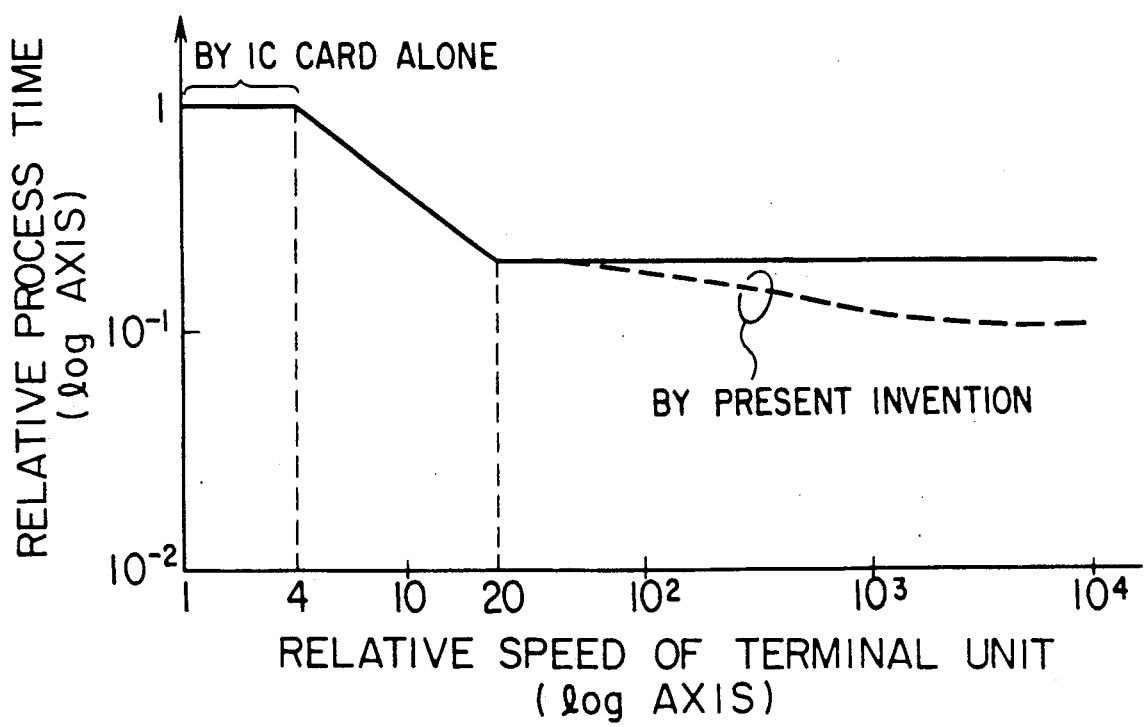

SERVER-AIDED COMPUTATION METHOD AND DISTRIBUTED INFORMATION PROCESSING UNIT

FIELD OF THE INVENTION

The present invention relates to a server-aided computation method and a distributed information processing unit for secretly distributing information of a host computer into a plurality of auxiliary units which compute the information.

DESCRIPTION OF THE RELATED ART

When a security service is used with cryptosystem, it is very important to safely distribute and control key information.

The open key cryptosystem RSA proposed by Rivetst et. al has come to public notice as a cryptosystem for solving most of such key distribution problems. The the present invention is based on the RSA cryptosystem, which is described in detail.

KEY GENERATION

First, generate any two large different prime numbers p and q. Generate $n = p \cdot q$ as a product of p and q being generated. Obtain $L = \lambda(n) = \text{LCM}(p-1, q-1)$ where $\lambda$ represents Carmichael function and LCM $(p-1, q-1)$ represents the least common multiple of $p-1$ and $q-1$. Select a proper integer e which is relatively prime against L ($3 \leq e \leq = L - 1$) and obtain the inverse element of multiplication, d, for e in the modulus L.

$$e \cdot d \equiv 1 \bmod L \tag{1}$$

The (e, n) produced in the above method is a key for an encipherment. The key can be deciphered using (d, n).

ENCIPHERMENT AND DECIPHERMENT

A plain text M and a code C are both integers less than n. They are enciphered by the following equation. In the following description, it is necessary to assume that any equal sign represents that a value on the left side is computed by using the right side.

$$C = M^e \bmod n \tag{2}$$

M can be obtained from C in the following equation.

$$M = C^d \bmod n \tag{3}$$

The conversion of the decipherment can be speeded up by using the secret information codes p and q of the receiving side. This method is described in a thesis written by J.J. Quisquater et al, "Fast decipherment algorithm for RSA public-key cryptosystem", Electron. Lett., 18, 21, pp, 905–907 (Oct. 1982).

To compute the value of equation (3), obtain it in moduli p and q rather than directly obtaining it in modulus n. Using the Chinese remainder theorem from the result being obtained, obtain the plain text. (For detail of the Chinese remainder theorem, see a thesis titled "Gendai Angou Riron (Modern Cryptosystem Theory)" by Ikeno, Koyama, et al., The Institute of Electronics, Information and Communication Engineers, (p. 19).

To practically explain this method, define $C_1$, $C_2$, $d_1$, $d_2$, $m_1$, and $m_2$ as follows $$C_1 = C \bmod p, \quad C_2 = C \bmod q \tag{4}$$

$$d_1 = d \bmod (p-1), \quad d_2 = d \bmod (q-1) \tag{5}$$

$$m_1 = M \bmod p, \quad m_2 = M \bmod q \tag{6}$$

At the time, the following equations are satisfied.

$$m_1 = C_1^{d_1} \bmod p \tag{7}$$

$$m_2 = C_2^{d_2} \bmod p \tag{8}$$

Thus, the plain text M can be obtained as a root of the following simultaneous congruent expressions.

$$M \equiv m_1 \pmod{p} \tag{9}$$

$$M \equiv m_2 \pmod{q} \tag{10}$$

The RSA cryptosystem is also used for a "digital signature." In this case, the equation is expressed as follows, $$S = M^d \bmod n$$

where a plain text is M and a signature text is S.

Although the RSA cryptosystem can be executed in the above method. Now, outline the cryptosystem.

A. Open keys e and n which are uniquely assigned to each person are made open to the public in the form of a list. Thus, any one can access the keys.

B. Secret keys d, p, q, and $\lambda(n)$ are kept secret to the public. The person who has the secret keys should take care not to disclose them.

C. Besides the encryption function, a signature function is also provided.

D. To secure the safety of the RSA cryptosystem, it is necessary to select around 100 digits in decimal notation for the number of digits of the secret keys p and q. In this case, n becomes a value of around 200 digits in decimal notation, resulting in requiring a huge processing amount of computation for conversions between the RSA encipherment and decipherment.

As an operation method for maximizing the benefits of the RSA cryptosystem, it is preferable to issue an individual key, to store the key in a portable recording medium, and to have the person who owns the key carry it. In this case, the item B described above is very important in the system operation. As the recording medium of the personal secret key which satisfies the condition of the item B, an IC card is most suitable as a portable and personal computing and recording apparatus. However, when the RSA cryptosystem using IC cards is built up, the following two problems arise.

When a key is stored in the IC card, due to the requirement of the item B above, ideally, it is preferable to execute the RSA decrypting conversion and generate a signature in the IC card. Since the IC card has an access control function which compares a password, when the secret keys d, p, q, and $\lambda(n)$ is converted in the IC card, the secret key d can be prevented from being divulged from the IC card. However, because of the huge processing amount described in the item D and insufficient computation capacity of the IC card, when the RSA code is converted by the IC card, it is difficult to accomplish a practical processing speed. This situation is same even if the high speed method proposed by Quisquater et al. described above. Although it is possible to consider to mount an RSA dedicated high speed computation LSI on the IC card, an increase of the IC card cost is inevitable.

On the other hand, it is quite easy to use the IC card as a key memory with the access control function. By having a unit with a high computation capacity other than the IC card, for example, a terminal unit execute the complicated code conversion, it is possible to accomplish the practical processing speed. However, in this case, since d is passed to the terminal unit, unless the design, maintenance, and control of the terminal unit are carefully done, d may be divulged to another person via the terminal unit. In addition, d may be unexpectedly stolen via a false terminal unit.

To solve such two problems, recently means for the IC card to efficiently perform the RSA code conversion using only the computation capability of the terminal unit without divulging information relating to the secret key d to the terminal unit have been proposed. This method is named "server-aided computation method" taken from the proposers. Although the server-aided computation method is a wide concept, the method remarkably relating to the RSA code conversion is described in the thesis titled "Anzenna Keisan Iraihou Ni Tsuite (Safety Computation Request Method)", by Kato, Matsumoto, and Imai, Code and Information Security Symposium Material F-3, February 1988. The method is described in the following.

As a preparation, firstly obtain $r_p$, $r_q$ and R which satisfy the following equations.

$$r_p = R^{-1} \bmod (p-1) \quad (11)$$

$$r_q = R^{-1} \bmod (q-1) \quad (12)$$

However, when it is defined that $\chi(r) = l(r) + w(r) - 2$, $r_p$ and $r_q$ are selected so that $$\chi(r_p) + \chi(r_q) \quad (13)$$

becomes a small value; $l(r)$ represents the bit length of r; $w(r)$ represents the hamming weight of r; and $\chi(r)$ represents the number of times of the modulo-multiplications necessary for the modulo-exponentiation where r is an exponent.

In addition, compute the following equations.

$$W_p = q \, (q^{-1} \bmod p) \bmod n,$$

$$W_q = p \, (p^{-1} \bmod q) \bmod n \quad (14)$$

In the IC card, $r_p$, $r_q$, R, d, p, q, $\lambda(n)$, n, $W_p$, and $W_q$ have been stored.

Then, using the following equation instead of d $$d' = d \cdot R \bmod \lambda(n) \quad (15)$$

the IC card requests the terminal unit to compute M' where C is converted by d' where $$M' = C^{d'} \bmod n. \quad (16)$$

The terminal unit returns M' being computed to the IC card. The IC card converts M' into the plain text M by using the following equation.

$$M = \{(M' \bmod p)^{r_p} \bmod p) \, W_p + (M' \bmod q)^{r_q} \bmod q) \, W_p\} \bmod n \quad (17)$$

Since $r_p$ and $r_q$ have been selected so that the value of the equation (13) becomes small, the modulo-exponentiation computation can be effectively performed by the IC card whose computation capacity is relatively small. In addition, to the terminal unit, the IC card sends d' converted by the equation (15) rather than d, thereby enhancing the degree of safety. When the server-aided computation is performed in the manner described above, the code conversion can be effectively performed with the computation capacity of the terminal unit as well as increasing the degree of safety of the secret key d.

As described above, when secret information such as the RSA cryptosystem is computed, if a unit computes a huge processing amount of information, it takes much computation time. For example, if an IC card whose computation capacity is relatively small executes such information, it takes much computation time. In addition, it is possible to consider to use an auxiliary unit as well as the main computation unit to share the computation load of the secret information between them so as to reduce the computation time. However, if the secret information is directly sent to the auxiliary unit, it may be stolen by the unit or a third party. For example, when d is sent to an external unit which can execute the RSA computation at a high speed, the secret information necessary for the deciyption and generation of a digital signature is known by the external unit and thereby the information may be invalidly used.

On the other hand, the secret information using the "server-aided computation" which has been proposed can be effectively converted using the computation capacity of an external unit without divulging the secret information. However, the external unit is not always reliable and the communication information may be changed by a third party. Thus, the requesting side cannot detect an invalidity of the requested side and a change of communication information by the third party. Consequently, the validity of the server-aided computation becomes doubtful.

SUMMARY OF THE INVENTION

An object of the present invention is to provide a server-aided computation method and a distributed information processing unit for preventing secret information from divulging to a requested side of the computation, for effectively computing the secret information using the computing capacity of the requested side, and for really validating the server-aided computation.

For example, the RSA cryptosystem can be used both for enciphering messages and for generating digital signatures.

The first invention is a server-aided computation method using a main unit for processing secret information and at least one auxiliary unit for supporting a computation that said main unit executes, said method comprising the steps of;

generating d' from a secret key d using m random numbers $R_i$ (where $i = 1, ..., m$) generated by said main unit having secret keys n and d;

transferring d' and n from said main unit to said auxiliary unit;

computing the following equation from a message block C in said auxiliary unit $$M' = C^{d'} \bmod n$$

computing X using said random numbers $R_i$ and n in said main unit while computing M' in said auxiliary unit;

transferring M' from said auxiliary unit to said main unit; and computing a message block M using the following equation in said main unit $$M = M' \cdot X \bmod n$$

The second invention is a server-aided computation method using a main unit for processing secret information and at least one auxiliary unit for supporting a computation that said main unit executes, said method comprising the steps of:

generating d' from a secret key d using m random numbers $R_i$ (where i=1, ..., m) generated by said main unit having secret keys n and d;

transferring d' and n from said main unit to said auxiliary unit;

computing the following equation from a message block C in said auxiliary unit $$M' = C^{d'} \bmod n$$

computing $X^{-1}$ using said random numbers $R_i$ and n in said main unit while computing M' in said auxiliary unit;

transferring M' from said auxiliary unit to said main unit; and computing a message block M using the following equation in said main unit $$M = M' \cdot X^{-1} \bmod n$$

The third invention is a server-aided computation method using a main unit for processing secret information and at least one auxiliary unit for supporting a computation that said main unit executes, said method comprising the steps of:

generating d' from a secret key d' using m random numbers $R_i$ (where i=1, ..., m) generated by said main unit having secret keys n and d;

transferring d' and n from said main unit to said auxiliary unit;

computing the following equation from a message block C in said auxiliary unit $$M' = C^{d'} \bmod n$$

computing X and $X^{-1}$ using said random numbers $R_i$ and n in said main unit while computing M' in said auxiliary unit;

transferring M' from said auxiliary unit to said main unit; and computing a message block M using M', X, and $X^{-1}$.

In the above server-aided computation methods, the auxiliary unit only knows d' and n which have been open and C and M'. Since the auxiliary unit cannot directly know the secret key d, it is impossible to devise a function which causes the auxiliary unit to steal the secret key d. The section of the computations for obtaining $X_{pi}$, $X_{qi}$, or $X_i$ that the main unit executes can be conducted independently from the computations that the second unit executes. In addition, by restricting the bit length of random numbers $r_{pi}$ and $r_{qi}$, the amount of the computation for obtaining $X_{pi}$ and $X_{qi}$ can be reduced.

The fourth invention is a server-aided computation method using a main unit for processing secret information and at least one auxiliary unit for supporting a computation that said main unit executes wherein $S = M^d \bmod n$ where a positive integer M less than an integer n given by a secret positive integer d which is sent to said auxiliary unit is raised to n-th power in accordance with an algebraic system where the given positive prime number or a composite number n is a modulus, said method comprising the steps of:

separating said integer n into k (k≧1) positive integers $n_j$ (where j=1, ..., k) each of which is relatively prime;

(b) separating said positive integer d into (m+1)×k non-negative integers $D_{1j} = [d_{j0}, f_{j1}, F_{j2}, ..., f_{jm}]$ which are secret information only for said main unit and which satisfy the following k sets of equations $$d \equiv d_{j0} + f_{j1} \cdot d_{j1} + f_{j2} \cdot d_{j2} + ... + f_{jm} \cdot d_{jm} \pmod{\lambda(n_j)}$$

where j=1, ..., k and $\lambda(n_j)$ is the Carmichael function of said positive integer n) and sets of the following m×k positive integers which are transferred to said auxiliary unit $$D_{2j} = [d_{j1}, d_{j2}, ..., d_{jm}] (j=1, ..., k);$$

(c) computing $Y_{ji} = M^{d_{ji}} \bmod n$ where i=1, ..., m and j=1, ..., k in said auxiliary unit and sending the results to said main unit; and (d) computing in said main unit the following equation using k values $Y_{j0} = M^{d_{j0}} \bmod n$ and above $Y_{ji}$ which have been computed by said main unit $$S = Y_{j0} \cdot Y_{j1}^{f_{j1}} \cdot Y_{j2}^{f_{j2}} \cdot ... \cdot Y_{jm}^{f_{jm}} \bmod n_j$$

where j=1, ... k and obtaining a result S which satisfies the k simultaneous equations relating to S.

The fourth invention can be also applied when said integer n is a prime number.

The fourth invention can be applied when said integer is a product of two prime numbers.

In the fourth invention, since $D_{ij}$ is kept secret to the auxiliary unit which supports the main unit, the auxiliary unit cannot know $D_{ij}$ unless it tries to execute the round robin method. Thus, it is possible for the main unit to execute the computation without divulging the secret information to the auxiliary unit.

In addition, when the computation speed of the auxiliary unit is satisfactorily high, the required computation can be executed at a higher speed than that executed only by the main unit.

As a special case of the fourth invention, when m×n non-negative integers $f_{j1}, f_{j2}, ..., f_{jm}$ are selected to 1 or 0, the computation load of the main unit can be reduced.

If a condition where the value $d_{ij}$ is defined so that $d_{ij} = d_{uv}$ is imposed for at least one set of integer pairs (i, j) and (u, v) (where 1≦i, u≦k, 1≦j, and v≦m), when the auxiliary unit executes $M^{d_{ij}} \bmod n$, it does not need to execute $M^{d_{uv}} \bmod n$ and thereby the entire computation load can be reduced.

The fifth invention is a distributed information processing unit having a main unit for processing secret information and at least one auxiliary unit for supporting a computation that said main unit executes, for executing a distributed process without divulging conversion of said secret information other than said main unit, said distributed information processing unit comprising:

conversion means for executing said conversion of input information and reverse conversion means for reversely converting the conversion results; and verification means for comparing the reverse conversion results of said reverse conversion means with said input information so as to verify the conversion results of said conversion means.

The sixth invention is a distributed information processing unit having a main unit for processing secret information and at least one auxiliary unit for supporting a computation that said main unit executes, for executing a distributed process without divulging conversion of said secret information other than said main unit, said distributed information processing unit comprising:

a plurality of conversion means for executing said conversion of input information; and verification means for mutually comparing the conversion results of said plurality of conversion means.

In the fifth and sixth inventions, by comparing the result of the reverse conversion obtained by the reverse conversion means with the input information or by mutually comparing a plurality of conversion results, the main unit can effectively execute the conversion with a support of the computation capacity of the requested side without divulging the secret information to the auxiliary unit of the requested side and determine whether the computation results are correct or not.

The seventh invention is a distributed information processing unit having a main unit for processing secret information and at least one auxiliary unit for supporting a computation that said main unit executes, for executing a distributed process without divulging conversion of said secret information other than said main unit, said distributed information processing unit comprising:

first conversion means for executing said conversion of input information;

second conversion means for executing an identity conversion;

and comparison means for comparing the conversion results of said second conversion means with said input information so as to verify the conversion results of said first conversion means.

In the seventh invention, by comparing the result obtained by conversion means using vectors created according to a special rule with input information, the main unit can execute the conversion without divulging the secret information intrinsic to the main unit, effectively execute the computation with an assistance of the computation capacity of the auxiliary unit of the requested side, and easily determine whether the computation request is correct or not without a communication for the verification and an assistance of the requested side.

BRIEF DESCRIPTION OF DRAWINGS

FIG. 10 is a chart showing a process time characteristic;

DETAILED DESCRIPTION OF PREFERRED EMBODIMENT

Figure 1:
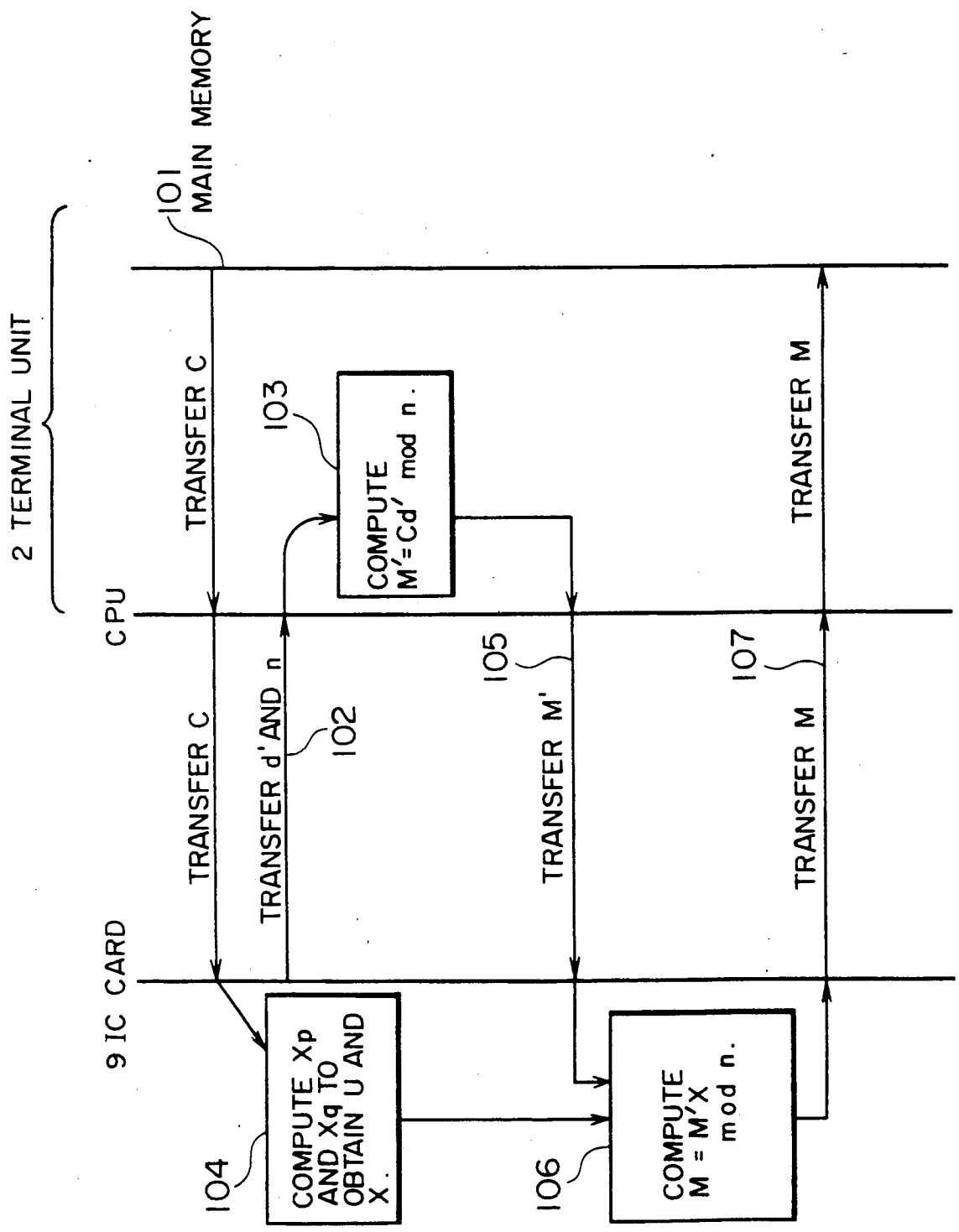
FIG. 1 is a processing flow chart of a server- aided computation method embodying the first invention.

An embodiment of the present invention is described in the following. For convenience of the description, as shown in FIG. 1, it is assumed that the requesting side of computation is the IC card and the requested side of computation is the terminal. However, the requesting side and requested side can be freely structured using devices and software in the range of the present invention. The embodiment is described as a server-aided computation where a cipher text is deciphered to a plain text. However, the present invention is also applicable to generate a digital signature by using the same conversion.

Figure 2:
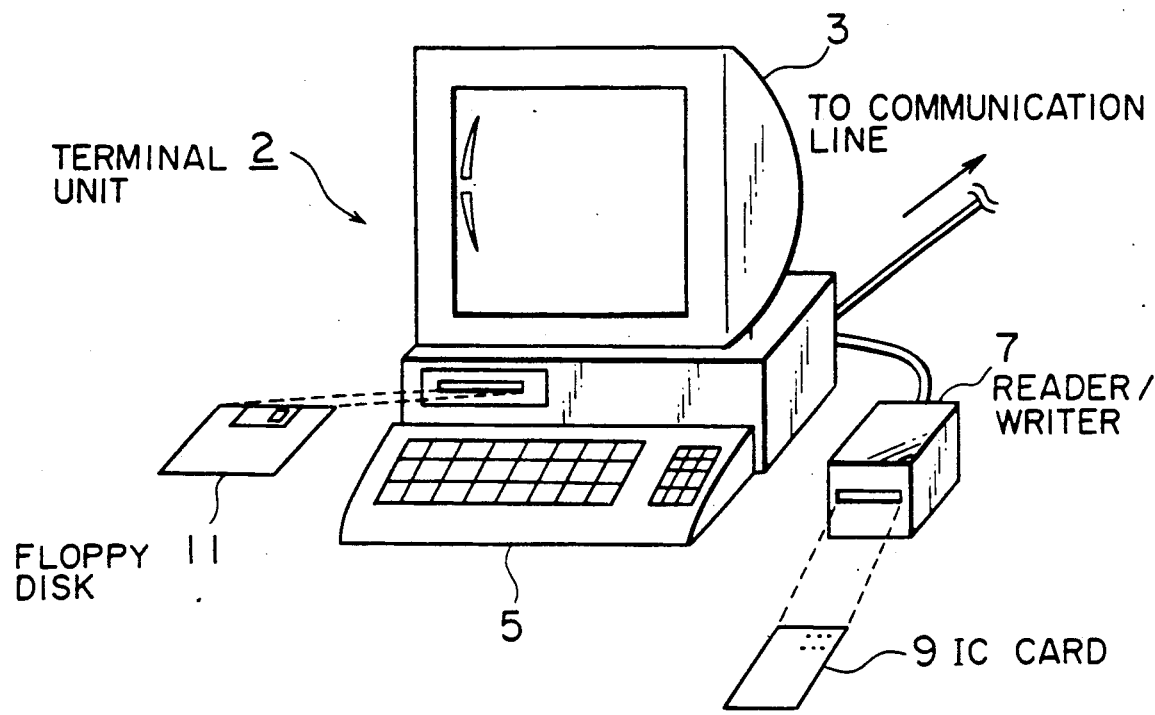
FIG. 2 is a perspective view of a terminal unit 2.

FIG. 2 is a perspective view of a terminal unit 2.

As shown in the figure, the terminal unit 2 is composed of a main unit 1, a display 3, a keyboard 5, and a reader/writer 7. An IC card 9 is inserted into the reader writer 7. A floppy disk 11 is inserted into the main unit 1.

Figure 3:
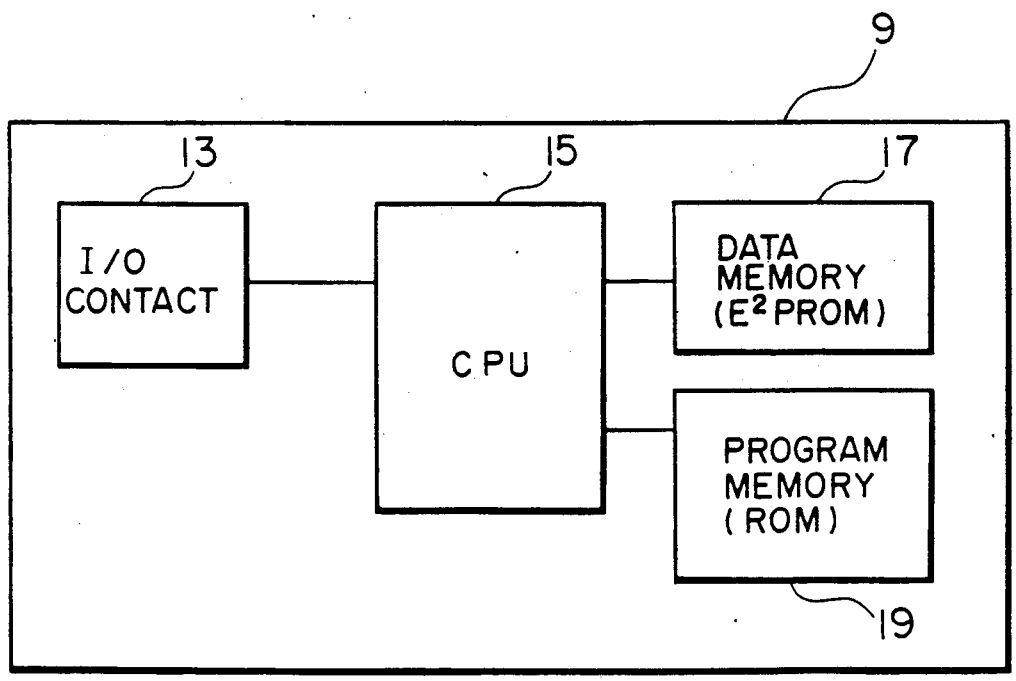
FIG. 3 is a block diagram showing the structure of an IC card 9.

FIG. 3 is a block diagram showing the structure of the IC card 9. The IC card 9 is provided with an I/O contact 13, a CPU 15, a data memory 17, and a program memory 19.

Figure 4:
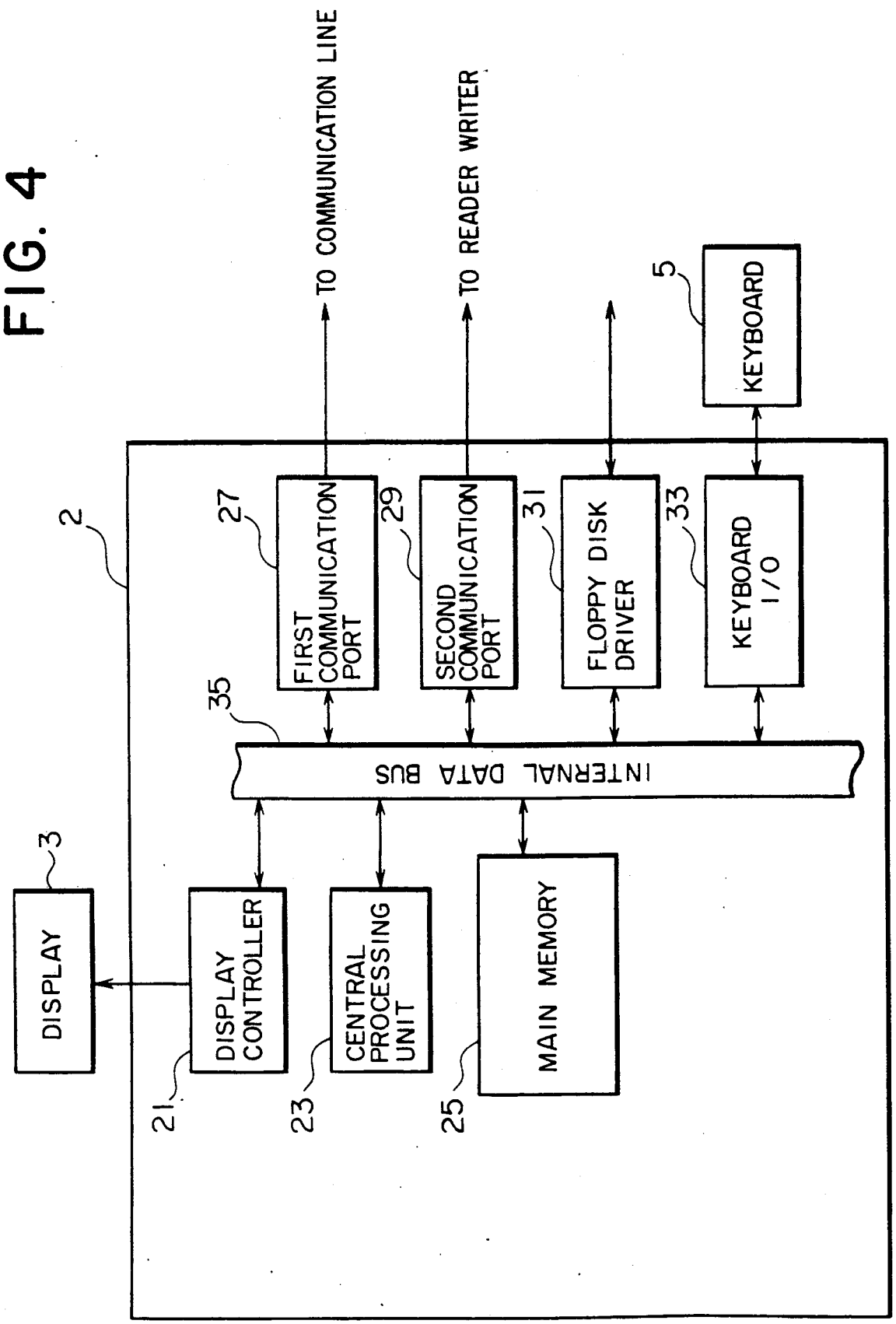
FIG. 4 is a block diagram showing the structure of the terminal unit 2.

FIG. 4 is a block diagram showing the structure of the main unit 1. The main unit 1 is composed of a display controller 21, a central processing unit 23, a main memory 25, a first communication port 27, a second communication port 29, a floppy disk driver 31, and a keyboard (I/O) 33, each of which is connected via an internal data bus 35. The display controller 21 controls the display 3. The central processing unit 23 controls the entire terminal unit 2. The main memory 25 stores programs that the central processing unit 23 executes and data used for the programs.

The first communication port 27 is connected to a communication line 12. The communication line 12 is connected to another terminal unit 2. The second communication port 29 is connected to the reader/writer 7. The floppy disk driver 31 drives the floppy disk 11. The keyboard (I/O) 33 is connected to the keyboard 5.

Next, using the terminal unit 2 and the IC card 9, the server-aided computation method is described.

As a preparation, a proper set of random numbers, $r_p$, $r_q$, and R, which satisfy the equations (18) and (19) similar to the equations (11) and (12) is obtained.

$$r_p = R \bmod (p-1) \tag{18}$$

$$r_q = R \bmod (q-1) \tag{19}$$

At the time, as described above, the restriction where the result of the following equation is relatively small is applied.

$$\chi(r_p) + \chi(r_q) \tag{20}$$

The simultaneous equations (18) and (19) are solved after $r_p$ and $r_q$ are properly defined. The existing condition of solution and the solution are described on pages 31-35 of Sadaharu Takagi's, "SHOTO SEISUURON KOUGI (Elementary Theory of Numbers)", Kyoritsu Syuppan. The solution of the simultaneous equations is uniquely obtained assuming that L=LCM (p−1, q−1) is a modulus. If necessary, the following equations are also computed.

$$w_p = q \, (q^{-1} \bmod p) \bmod n,$$

$$w_q = p \, (p^{-1} \bmod q) \bmod n \tag{21}$$

As described later, $w_p$ and $w_q$ are constants which should not be always prepared. In the present embodiment, $r_p$, $r_q$, d, p, q, $\lambda(n)$, n, d', $w_p$, and $w_q$ have been stored in the IC card.

As a simplest and most effective embodiment, the conversion where d' is obtained from d is defined using the following equation.

$$d' = (d - R) \bmod \chi(n) \tag{22}$$

Figure 5:
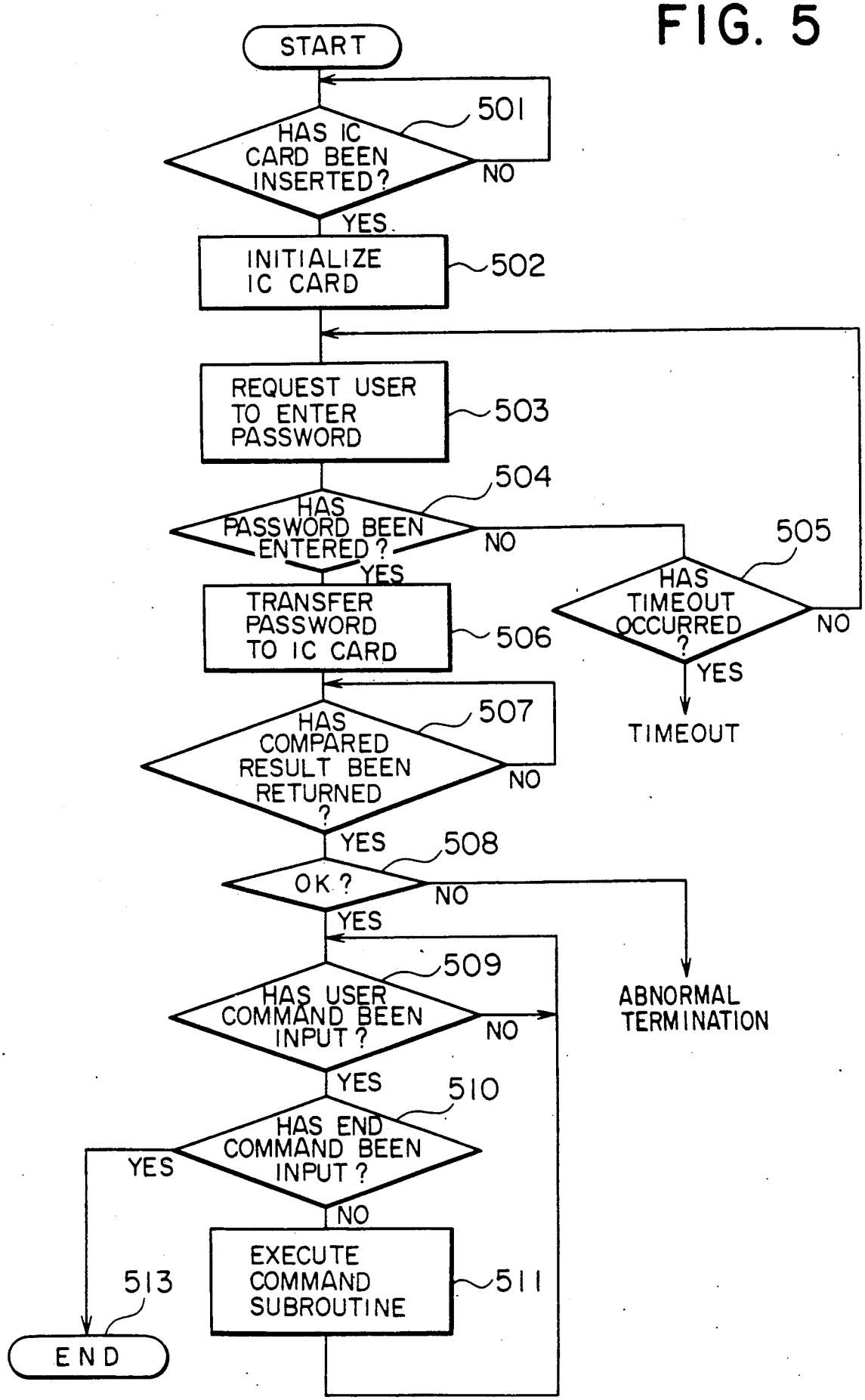
FIG. 5 is a flow chart showing the process of the terminal unit 2.

FIG. 5 is a process flow chart showing a process of the terminal unit 2.

First, the user faces the terminal unit 2 and then inserts the own IC card 9 into the reader writer 7 for the IC card 9 which is connected to the terminal unit 2 (in step 501).

The user presses proper keys on the terminal unit 2 to inform the terminal unit 2 that the operation thereof is started. At the time, a clock and power are supplied to the IC card 9 via the reader writer 7. After the IC card 9 is initialized (in step 502), the IC card 9 enters a communication waiting state. The terminal unit 2 requires the user to enter the own password to verify whether the the user of the IC card 9 is valid or invalid (in step 503).

When the password is not entered (in step 504), the elapsed time is checked (in step 505). When the specified time elapsed, a timeout occurs. Otherwise, the control returns back to step 503. When the password is entered, the password is transferred to the IC card 9 (in step 506). The password is compared with the registered password stored in the IC card 9 and the compared result is transferred to the terminal unit 2 (in step 507). When the compared result is OK (in step 508), the IC card 9 becomes a valid state. When the compared result is not OK, the IC card 9 becomes an invalid state. When the user enters a command (in step 509), whether the entered command is an end command or not (in step 510) is checked and a command subroutine is executed (in step 511).

An execution of the command subroutine is described in the following.

The process that follows is shown in FIG. 1.

The terminal unit 2 transfers the cipher text C to the IC card 9 (in step 101) and reads d' and n which have been written in the memory of the IC card 9 (in step 102). The terminal unit 2 computes M' from the cipher text C using the two pieces of information (in step 103).

$$M' = C^{d'} \bmod n \tag{23}$$

The terminal unit 2 sends M' which has been computed to the IC card 9 (in step 105).

On the other hand, the IC card 9 obtains a constant X according to the equations (24) to (26) along with the computation in the terminal unit 2 (in step 104).

$$X_p = (C \bmod p)^{r_p} \bmod p \tag{24}$$

$$X_q = (C \bmod q)^{r_q} \bmod q \tag{25}$$

The above equations are computed and X is obtained using the following equation.

$$X = \{((X_p)^{r_p} \bmod p) \, w_p + ((X_q)^{r_q} \bmod q) \, w_q\} \bmod n \tag{26}$$

The equations (24) to (26) are supplementarlly described in the following.

Although it can be considered that the equations (24) and (25) are simultaneous equations for X. X which satisfies the above two equations can be uniquely obtained from the Chinese remainder theorem. The one solution of the equations is the right side of the equation (26). X has been obtained using the two auxiliary variables $w_p$ and $w_q$.

However, the method for obtaining X which satisfies the equations (24) and (25) is not limited to the above method. For example, another solution is represented in the theses on pages 905-907 of J. J. Quisquater et al., "Fast decipherment algorithm for RSA public-key cryptosystem", Electron. Lett., 18, 21, October 1982.

Therefore, the obtainment of X and use of the auxiliary variables $w_p$ and $w_q$ by the equation (26) are not essential. Rather, the obtainment of X which satisfies both the equations (24) and (25) is essential. Thus, this embodiment does not limit the method for obtaining X when the first invention is actually accomplished.

Although the plain text M that the IC card 9 needed t0 obtain can be obtained by converting the cipher text C using the following equation.

$$M = C^d \bmod n \tag{27}$$

where M is obtained from M' computed by the terminal unit 2 and X computed by the IC card 9 using the following equation (in step 106).

$$M = (M' \cdot X) \bmod n \tag{28}$$

In this example, the computation is executed in the IC card 9. The IC card 9 transfers M, which has been obtained, as the deciphered result to the terminal unit 2 (in step 107).

The terminal unit 2 displays the deciphered result on the display and writes it to the auxiliary storage unit to complete the decipher process sequence. The user removes the IC card 9 from the reader writer 7 and completes the operation.

In the present embodiment, since the terminal unit 2 can easily obtain X from M and M' in the process, it is necessary to note that the computation of the equation (28) can be executed in the terminal unit 2 rather than the IC card 9. In this process, the terminal unit 2 does not transfer M' to the IC card 9. Rather, the IC card 9 transfers X to the terminal unit 2.

In the above process, it is obvious that M can be correctly computed using the equation (28) as described below.

From the equations (24) to (26), the following equation is satisfied by the Chinese remainder theorem which has been mentioned as [Related Art].

$$X = C^R \bmod n \qquad (29)$$

On the other hand, the following equation is also satisfied.

$$M = C^{d} \bmod n = C^{(d-R) \bmod \lambda(n)} \bmod n \qquad (30)$$
$$= C^{d-R} \bmod n = C^d \, C^{-R} \bmod n$$

From the equations (29) and (30), the following equation is also satisfied.

$$(M \cdot X) \bmod n = (C^d \, C^{-R} \cdot C^R) \bmod n = C^d \bmod n \qquad (31)$$
$$= M$$

Thus, it is obvious that the equation (28) is satisfied.

Then, the computation load is considered in the following. The computations from the equations (18) to (22) can be prepared before the conversion is started. After the cipher text is given, it is possible to consider the computations only for portions which are executable. As steps to be executed after C is given, (1) Obtainment of X by the IC card 9 using the equations (24) to (26); (2) Computation of the equation (23) by the terminal unit 2; and (3) Computation of the equation (28) by the The IC card 9. In the above three steps, the computation (2) that the terminal unit 2 performs requires the largest computation load.

Practically, this value can be represented as χ(d') However, when n is 512 bits, a modulo-multiplication for 512 bits should be executed 1024 times in the worst case. The step that requires the next largest computation load is (1). The equations which require major computation load in step (1) are the equations (24) and (25). They require a modulo-multiplication for 256 bits χ(r$_p$)+χ(r$_q$) times. By selecting small values for r$_p$ and r$_q$ in advance, the computation load can be reduced. The computation in step (3) that the IC card 9 performs is a modulo-multiplication for 512 bits one time. The major portions of the computation load are the computations in steps (1) and (2). In the first invention, particularly note that the step (1) and the step (2) are independent and they can be executed in parallel. For example, when a general purpose personal computer takes 30 seconds for executing the computation in step (2), if the bit length of r$_p$ and r$_q$ is determined to a proper value and thereby the computation time of step (1) executed by the IC card becomes approx. 30 seconds, the total computation time for the decipherment could become around 30 seconds. When the periods of time necessary for the computations in steps (1) to (3) are represented as T1, T2, and T3, respectively, the total computation time T can be generally represented as the following equation.

$$T = Max\,(T1,\,T2) + T3 \approx Max\,(T1,\,T2) \qquad (32)$$

where Max (A, B) is a function which selects a larger one of A and B.

In the first embodiment, the process for obtaining M using the set of M' and (X$_p$, X$_q$) or using values equivalent to the set is not limited to the method described above. Another method for obtaining M is described in the following.

Using the following two equations, from M, $$M_p = M \bmod p \qquad (33)$$

$$M_q = M \bmod q \qquad (34)$$

by computing M'$_p$ and M'$_q$, the following two equations are obtained.

$$M_p = M'_p \cdot X_p \bmod p \qquad (35)$$

$$M_q = M'_q \cdot X_q \bmod p \qquad (36)$$

By simultaneously solving the equations (35) and (36), the required M can be obtained.

Figure 6:
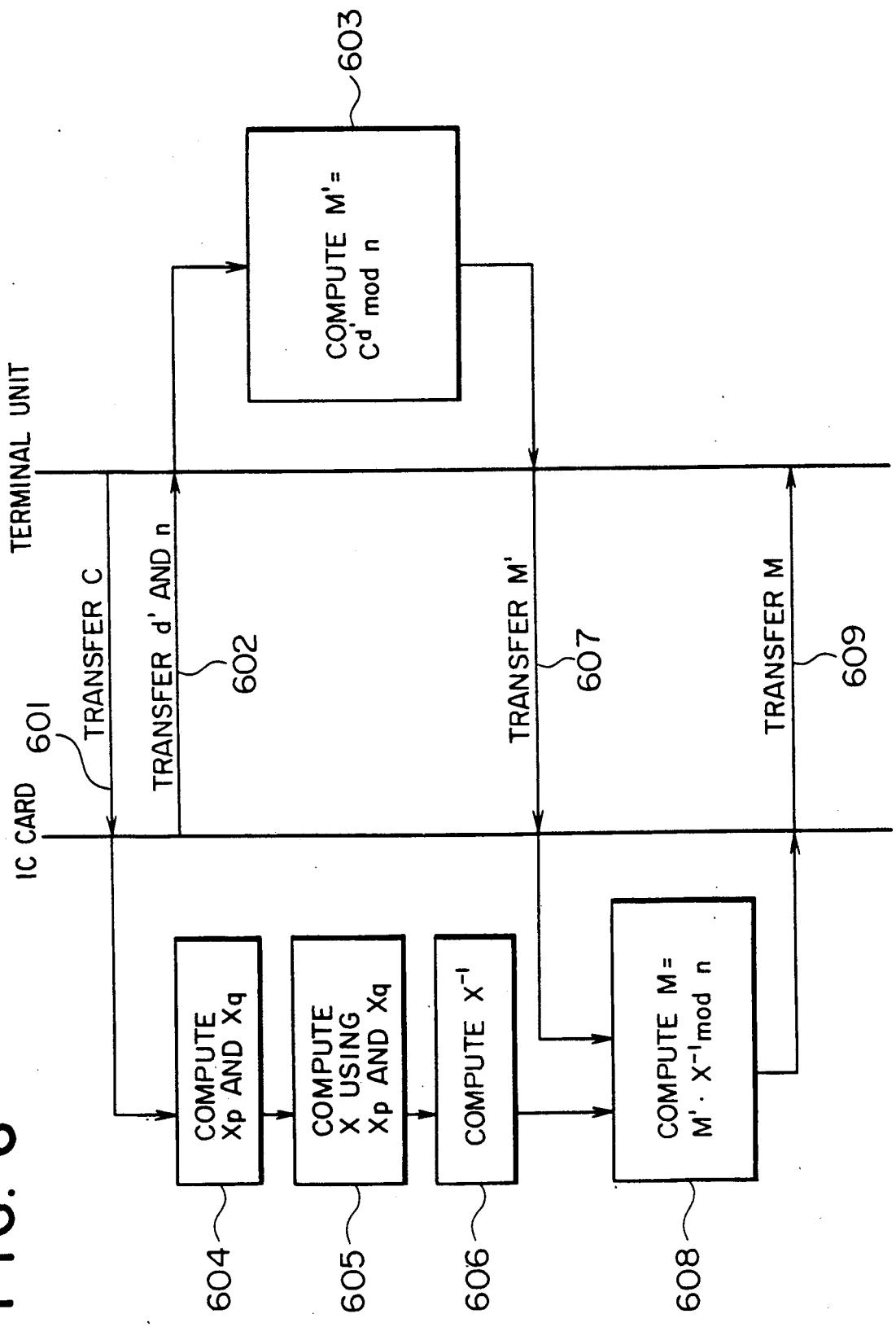
FIG. 6 is a process flow chart of a server- aided computation method embodying the second invention.

Then, as an embodiment of the second invention, according to FIG. 6, the conversion where d' is obtained from d is defined using the following equation.

$$d' = (d + R) \bmod \lambda(n) \qquad (37)$$

In the description that follows, the startup of the terminal unit 2 and the initialization of the IC card 9 are omitted. Rather, only the process for the computation is sequentially described. It is assumed that R used in the first embodiment is the same as that in this embodiment. Like the embodiment of the first invention, the terminal unit 2 transfers the cipher text C which has been input from the outside to the IC card (in step 601). The terminal unit 2 receives d' and n from the IC card 9 (in step 602). Like the first embodiment, the terminal unit 2 computes M' which is given in the following equation (in step 603).

$$M' = C^{d'} \bmod n \qquad (38)$$

The terminal unit 2 sends M, computed therein back to the IC card 9 (in step 607).

On the other hand, the IC card 9 computes the following equations (in step 604)

$$X_p = (C \bmod p^{r_p}) \bmod p \qquad (39)$$

$$X_q = (C \bmod q^{r_q}) \bmod p \qquad (40)$$

and obtain X using the following equation (in step 605).

$$X = \{((X_p)^{r_p} \bmod p)\, w_p + ((X_q)^{r_q} \bmod q)\, w_q\} \bmod n \qquad (41)$$

In addition, by solving the following equation $$X^{-1} \cdot X = 1 \bmod n \; (tm\;42)$$

$X^{-1}$ is obtained (in step 606). This solution is named the extended Euclidean algorithm. For details, see the thesis "Gendai Angou Riron" described above.

The value to be obtained by the IC card 9, namely M, is expressed as follows.

$$M = C^d \bmod n \qquad (32)$$

This value is obtained from the following equation using M' which has been computed by the terminal unit 2 and $X^{-1}$ which has been computed by the IC card 9 (in step 608).

$$M = (m' \cdot X^{-1}) \bmod n \quad (44)$$

The IC card 9 transfers the result being obtained to the terminal unit 2 and completes the process (in step 609).

In the following, it will become obvious that M can be correctly computed from the equation (44).

From the equations (35) to (38) and the Chinese remainder theorem, the following equation is satisfied.

$$X^{-1} = C^{-R} \bmod n \quad (45)$$

On the other hand, since M' can be expressed as follows, $$\begin{aligned} M' &= C^{d'} \bmod n \quad (46) \\ &= C^{(d+R) \bmod \lambda(n)} \bmod n \\ &= C^{d+R} \bmod n \\ &= C^d C^R \bmod n \end{aligned}$$

From the equations (29) and (30), $$\begin{aligned} (M' \cdot X^{-1}) \bmod n &= (C^d C^R \cdot C^{-R}) \bmod n \quad (47) \\ &= C^d \bmod n \\ &= M \end{aligned}$$

Thus, it is obvious that the equation (28) is satisfied.

In the embodiment of the second invention, the process for obtaining M using M' and the set of $(X_p, X_q)$ or a value equivalent to this set is not limited to the method described above.

For example, by computing $C^{-1}$ using the extended Euclidean algorithm in advance, the following equations can be computed.

$$X_p^{-1} = (C^{-1} \bmod p)^{r_p} \bmod p \quad (48)$$

$$X_q^{-1} = (C^{-1} \bmod q)^{r_q} \bmod q \quad (49)$$

Using the results, $X^{-1}$ can be computed. M can be obtained in the same manner as the equation (40).

In addition, from the following two equations using M $$M'_p = M' \bmod p \quad (50)$$

$$M'_q = M' \bmod q \quad (51)$$

$M'_p$ and $M'_q$ are obtained and thereby the following equations are satisfied.

$$M_p = M'_p \cdot X_p^{-1} \bmod p \quad (52)$$

$$M_q = M'_q \cdot X_q^{-1} \bmod q \quad (53)$$

By simultaneously solving the equations (48) and (49), the required M can be obtained. The effect of the second invention is the same as that of the first invention.

As an embodiment of the third invention, a more generalized method is described. In the first and the second embodiments, the unique random number R has been used in the algebraic system where the Carmichael function (n) is a modulus. In the embodiment of the third invention, a general format using m random numbers $R_i$ (i=1, ..., m; m≧1) is described. Firstly, it is assumed that each random number $R_i$ satisfies the following equations.

$$R_i \bmod p = r_{ip} \quad (54)$$

$$R_i \bmod q = r_{iq} \quad (55)$$

Like the embodiment of the first invention, it is also assumed that the value of the following expression is properly restricted.

$$\sum_{i=1}^{m} \{\chi(r_{ip}) + \chi(r_{iq})\} \quad (56)$$

As suggested in the equations (54) to 56), it is necessary to define $r_{ip}$ and $r_{iq}$ and then obtain $R_i$.

Using $R_i$ obtained in the above manner, each conversion $f_i$ from x to y is defined.

$$y = f_i(R_i, x) \quad (57)$$

Using the resultant conversion where m conversions are composed, d, is converted into d'.

$$d' = f_m(R_m, ..., f_2(R_2, f_1(R_1, d))...) \quad (58)$$

As the practical definition of $f_i$, the following three types can be used.

$$y = x \cdot (R_i^{-1}) \bmod \lambda(n) \quad (59)$$

$$y = (x - R_i) \bmod \lambda(n) \quad (60)$$

$$y = (x + R_i) \bmod \lambda(n) \quad (61)$$

The equation (59) is the function which has been described. The equations (60) and (61) are the functions which have been represented in the embodiments of the first and the second inventions. By using any combination of the above functions, the server-aided computation can be accomplished.

Like the above example, the IC card 9 sends d' which has been obtained in the equation (58) to the terminal unit 2. The terminal unit 2 obtains M' from the following equation.

$$M' = C^{d'} \bmod n \quad (62)$$

The terminal unit 2 sends M' back to the IC card 9. The IC card 9 obtains M from M' in accordance with the M obtainment process determined by the conversion process of the equation (58). Like the above example, for the conversions according to the equations (60) and (61), along with the computation by the terminal unit 2, the following values necessary for the conversion for obtaining M from M' can be computed.

$$X_{pi} = (C \bmod p)^{r_{ip}} \bmod p \quad (63)$$

$$X_{qi} = (C \bmod q)^{r_{iq}} \bmod q \quad (64)$$

In this embodiment, the method for obtaining M is omitted because it can be easily accomplished by applying the prior art and the embodiments of the first and the second inventions.

Therefor, according to the first, the second, and the third inventions, the method for accomplishing most of the processes of the terminal unit 2 and the IC card 9 at the same time is provided and thereby the process time necessary for the server-aided computation can be remarkably reduced.

In addition, according to the first invention to the third inventions, it is not necessary to excessively increase the process speed of the IC card, thereby reducing the costs of the terminal unit 2 and the IC card 9.

In the following, an embodiment of the fourth invention is described.

This embodiment is described assuming that the IC card 9 and one POS unit are used as the main unit and the auxiliary unit, respectively.

The system structure is the same as those shown in FIGS. 2 to 4. The computation section is shown in FIG. 7.

The invention can be expressed in a general form where k $D_1$ and k $D_2$ are provided so that a modulus n can be separated into k factors each of which is a prime number. Namely, $D_{j1}$, $D_{j2}$ (j = 1, 2, ... k) FIG. 7 is shown in such manner. In this embodiment, firstly, the case of k = 1 is described.

Figure 7:
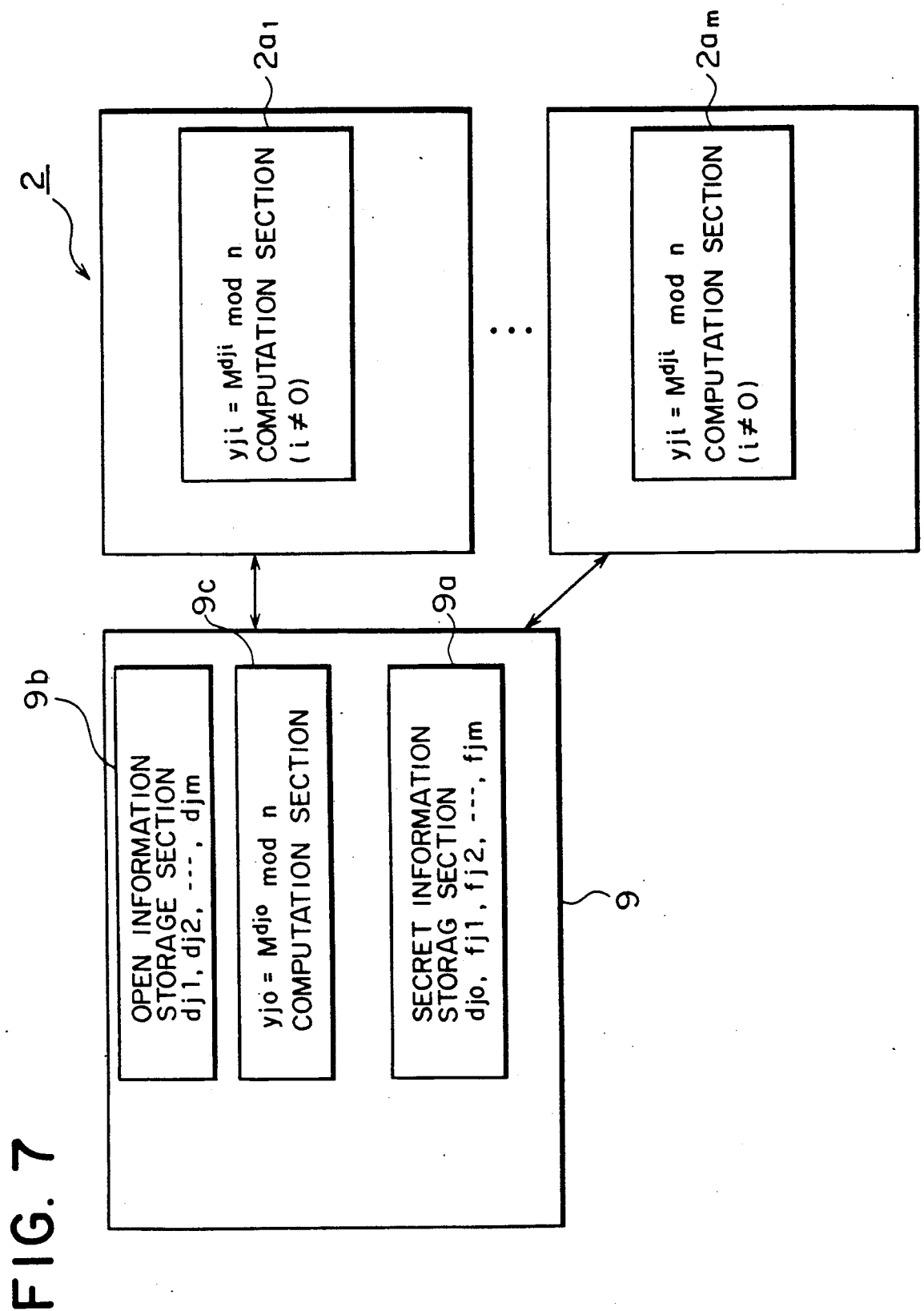
FIG. 7 is a block diagram showing a computation section and the unit.

As shown in FIG. 7, the IC card 9 stores a plurality of positive integers $D_1 = [d_0, f_1, f_2, ..., f_m]$ and the open information storage section 1b stores $D_2 = [d_1, d_2, ..., d_m]$, each of which satisfies the following equation.

$$d \equiv d_0 + f_1 \cdot d_1 + f_2 \cdot d_2 + ... + f_m \cdot d_m \pmod{\lambda(n)} \quad (65)$$

where D1 is secret information of the IC card 9 and is structured so that it cannot be normally read from the outside.

The user of the IC card 9 generates a modulo-exponentiation value expressed by the following equation from the digital information M using the IC card 9 and the terminal unit 2.

$$S = M^d \bmod n \quad (66)$$

It is a digital signature of the RSA cryptosystem.

In this embodiment, a generation of the digital signature is exemplified. The present invention is applicable also to the encipherment of the RSA cryptosystem.

Figure 8:
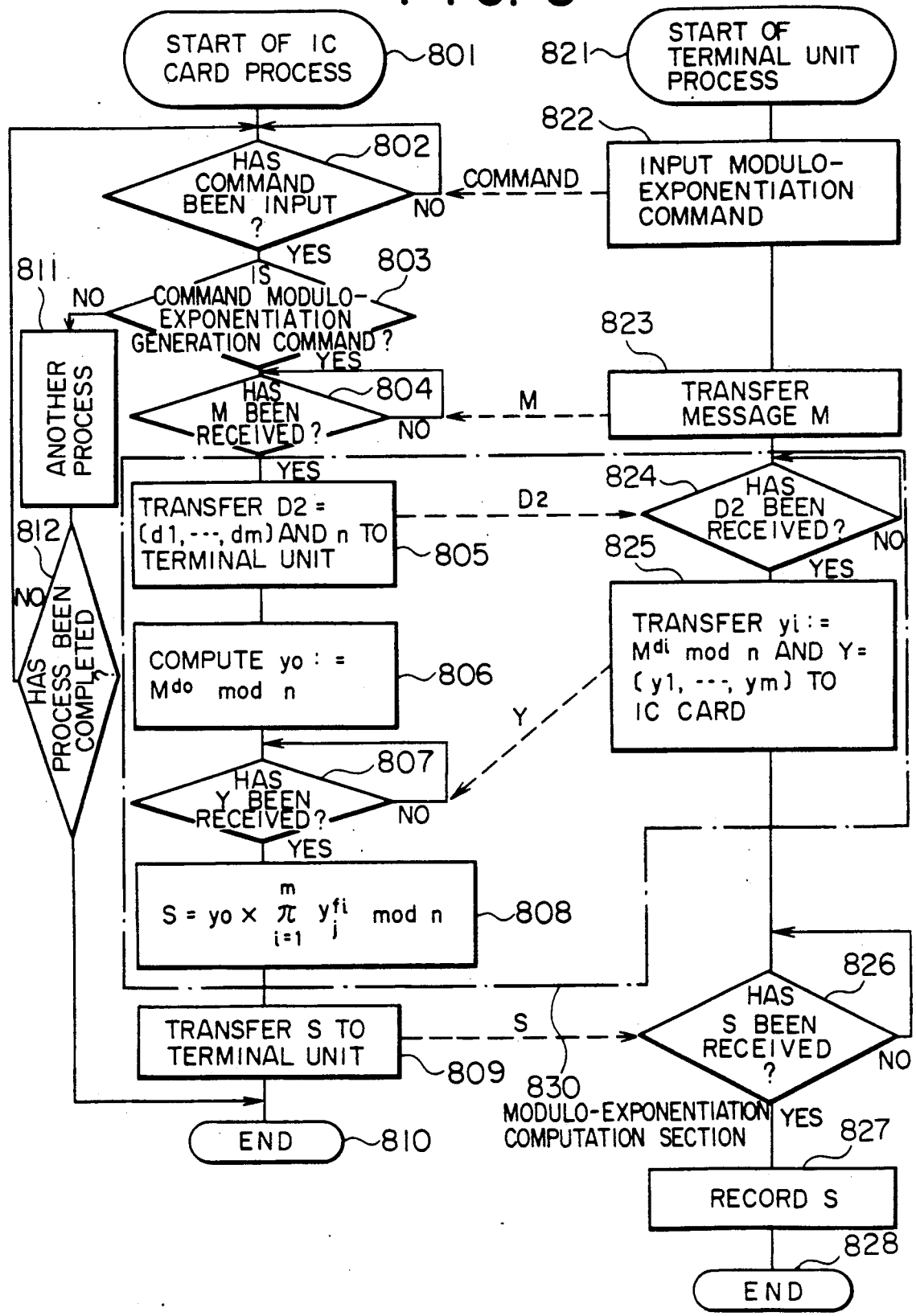
FIGS. 8 and 9 are diagrams showing a process where the fourth invention is structured by the IC card and the terminal.

The computation process is described in the following by referring to FIG. 8.

The user inserts the IC card 9 into the reader writer 7 of the terminal unit 2, commands the start of the terminal unit 2 in accordance with a predetermined sequence, and enter the message M (in steps 801 to 804).

The message is detail of shopping, for example.

The IC card 9 transfers $D_2 = [d_1, d_2, ..., d_m]$ and the value n of the modulus to the terminal unit 2 (in steps 805 and 824).

The terminal unit 2 computes m $y_i$'s using $D_2$ and n received by computation sections $2a_1$ to $2a_m$ as expressed in the following equation.

$$y_i = M^{di} \bmod n \ (i = 1, ..., m) \quad (67)$$

After that, the terminal unit 2 transfers $y_i$ to the IC card 9 (in steps 825 and 807).

On the other hand, the IC card 9 obtains $y_0$ from the following equation using the secret information $d_0$ in a computation section 9c.

$$y_0 = M^{d0} \bmod n \quad (68)$$

In addition, the IC card 9 obtains the signature S from the following equation using $y_1, ..., y_m$ received from the terminal 2 (in step 808).

$$S = y_0 \cdot y_1^{f_1} \cdot y_2^{f_2} \cdot ... \cdot y_m^{f_m} \bmod n \quad (69)$$

The IC card 9 transfers the signature S to the terminal unit 2 (in step 809). The terminal unit 2 records the signature S and completes the signature process.

In this embodiment, when $f_1, ..., f_m$ are represented in binary notation (0 or 1), the computation of the power which is apparently present in the equation (69) can be omitted, thereby decreasing the computation load of the IC card 9.

There are following three major effects in this embodiment.

(1) Since the secret information of the IC card 9 is not directly transferred to the terminal unit 2, the terminal unit 2 cannot know the secret information d of the IC card 9. In addition, the secret information d can be kept secret against a third party who tries to wiretap the communication between the IC card 9 and the terminal unit 2.

(2) Using a sufficiently high speed terminal unit 2, the process time can becomes shorter than that of the IC card 9 which executes the modulo-exponentiation computation.

(3) By properly selecting the secret information of the IC card 9, the process time can be reduced. This effect becomes remarkable when $d_o \geq 2$ and $f_1, ..., f_m$ are represented in binary notation. This embodiment can be also applied to the key-in-common system proposed by Diffie - Hellman. In this case, the differences are that n becomes prime number p and $$\lambda(n) = p - 1.$$

Another embodiment according to the fourth invention is described in the following.

In this embodiment, like the above embodiment, generations of the RSA cryptosystem and a digital signature are exemplified using the IC card system. It is necessary to note that in the RSA cryptosystem n is the product of two large prime numbers p and q and n = p·q can be satisfied.

In this embodiment, in the IC card 9, a plurality of positive integer sets $D_{11} = [d_{10}, f_{11}, ..., f_{1m}]$, $D_{12} = [d_{20}, f_{21}, ..., f_{2m}]$, and $D_2 = [d_1, ..., d_m]$ have been stored, each of which satisfies the following equations.

$$d \equiv d_{10} + f_{11} \cdot d_1 + f_{12} \cdot d_2 + ... + f_{1m} \cdot d_m \pmod{p-1} \quad (70)$$

$$d \equiv d_{20} + f_{21} \cdot d_1 + f_{22} \cdot d_2 + ... + f_{2m} \cdot d_m \pmod{p-1} \quad (71)$$

where $D_{11}$ and $D_{12}$ are secret information of the IC card 9 and they are structured so that they cannot be normally read from the outside.

The user of the IC card 9 generates a modulo-exponentiation value expressed by the following equation from the digital information M using the IC card 9 and the terminal unit 2.

$$S = M^d \bmod n \quad (72)$$

Figure 9:
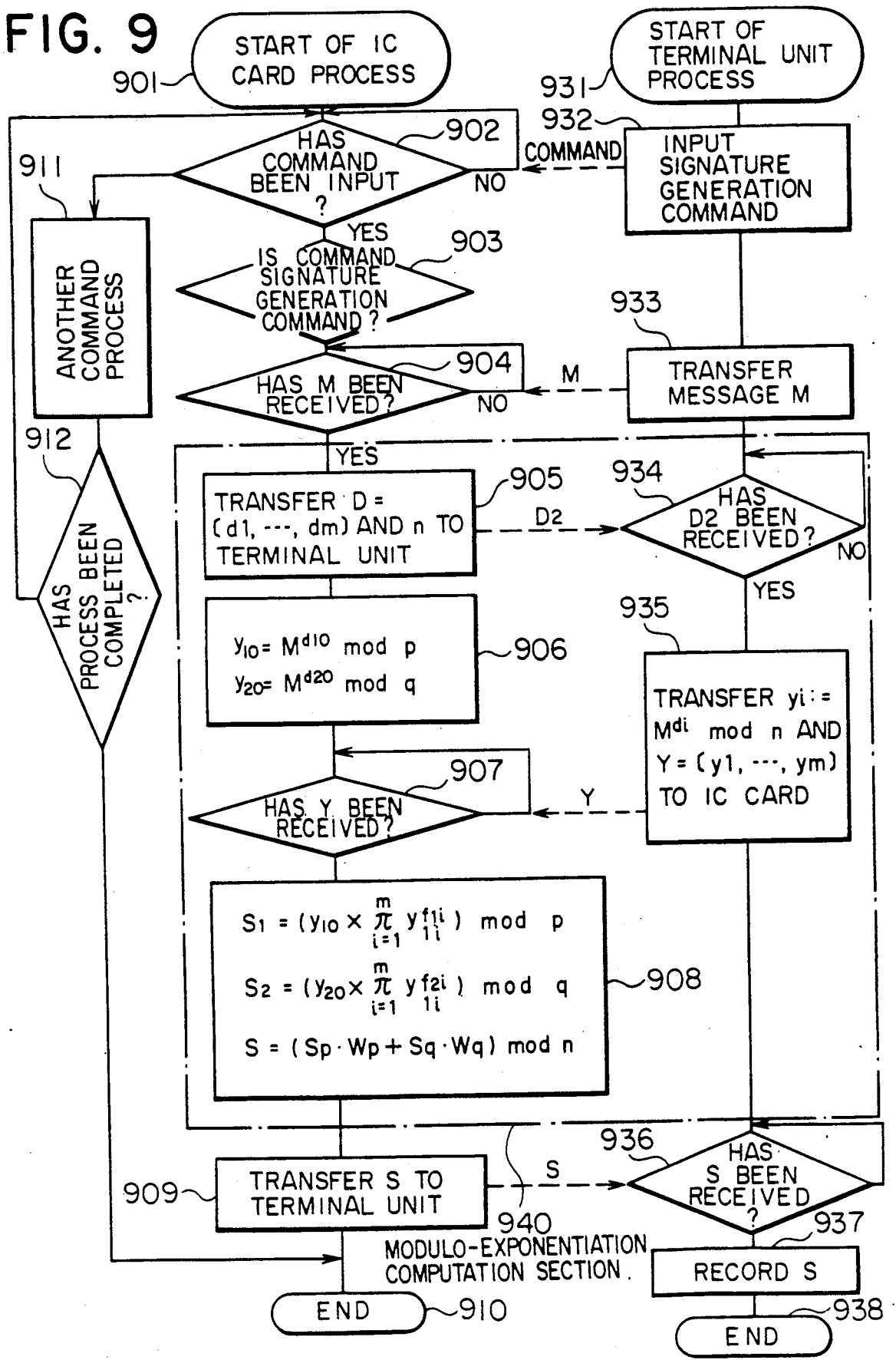

FIG. 9 shows process steps for computing the signature S in the embodiment.

Since the process steps of FIG. 9 are the same as those of FIG. 8 except for the power remainder computation section in step 940, only the step 940 is described in the following.

Firstly, the IC card 9 transfers the open information $D_2$ to the terminal unit 2 (in steps 905 and 934).

The terminal unit 2 computes m $y_i$'s using $D_2$ and n, which have been received, from the following equation.

$$y_i = M^{di} \bmod n \ (i=1, ..., m) \quad (73)$$

The terminal unit 2 transfers $y_i$ to the IC card 9 (in steps 935 and 907).

On the other hand, the IC card 9 obtains $y_{10}$ and $y_{20}$ from the following equations using the secret information $d_{10}$ and $d_{20}$ stored in the IC card 9 (in step 908).

$$y_{10} = M^{d10} \bmod p \quad (74)$$

$$y_{20} = M^{d20} \bmod q \quad (75)$$

The IC card 9 computes S1 and S2 using $y_1, ..., y_m$, which have received from the terminal unit 2, and $y_{10}$ and $y_{20}$ from the equations (74) and (75) (in step 908).

$$S_1 = y_{10} \cdot y_1^{f11} \cdot y_2^{f12} ... y_m^{f1m} \bmod p \quad (76)$$

$$S_2 = y_{20} \cdot y_1^{f22} \cdot y_2^{f22} ... y_m^{f2m} \bmod p \quad (77)$$

Since p and q are relatively prime, from the Chinese remainder theorem, the number S which satisfies the following equations and which is less than n is uniquely determined. The number S is the desired digital signature S.

$$S_1 = S \bmod p \quad (78)$$

$$S_2 = S \bmod q \quad (79)$$

Although these equations can be solved in various methods, by computing Wp and Wq which satisfy the following equations $$W_p = q \ (q^{-1} \bmod q) \quad (80)$$

$$W_q = p \ (p^{-1} \bmod q) \quad (81)$$

and by storing them in the IC card 9 in advance, S can be computed from the following equation.

$$S = (S_1 \cdot W_p + S_2 \cdot W_q) \bmod n \quad (82)$$

The IC card 9 transfers S to the terminal unit 2 (in step 909). The terminal unit 2 records it and completes the signature generation process (in steps 936 to 938).

In this embodiment, the same effects as (1) to (3) described in the above embodiment are accomplished. Particularly, the effect (3) is remarkably accomplished when $d_{10} \geq 2$ and $d_{20} \geq 2$ and $f_{11}, ..., f_{1m}$, and $f_{21}, ..., f_{2m}$ are represented in binary notation.

Lastly, the effect of shortening the process time in another embodiment of the fourth invention is shown in FIG. 10.

The vertical axis of the chart represents a relative value of the process time (assuming that the process time on which the IC card 9 generates a signature by itself is 1). The horizontal axis of the chart represents a relative value v of the process speed of the terminal unit 2 (assuming that the computation speed of the IC card 9 is 1).

Approximately, in the range of $20 \leq v \leq 1000$, it is obvious that the process time of the server-aided computation method of the fourth invention becomes short.

Consequently, according to the fourth invention, the secret information of the main unit such as the IC card 9 which operates as the main computation unit can be processed in shorter time than that executed by the main unit alone using the computation capacity of the auxiliary unit without divulging the secret information to the auxiliary unit.

A method for determining whether the result obtained by the server-aided computation method described above is valid or invalid and the related units are described in the following.

Figure 11:
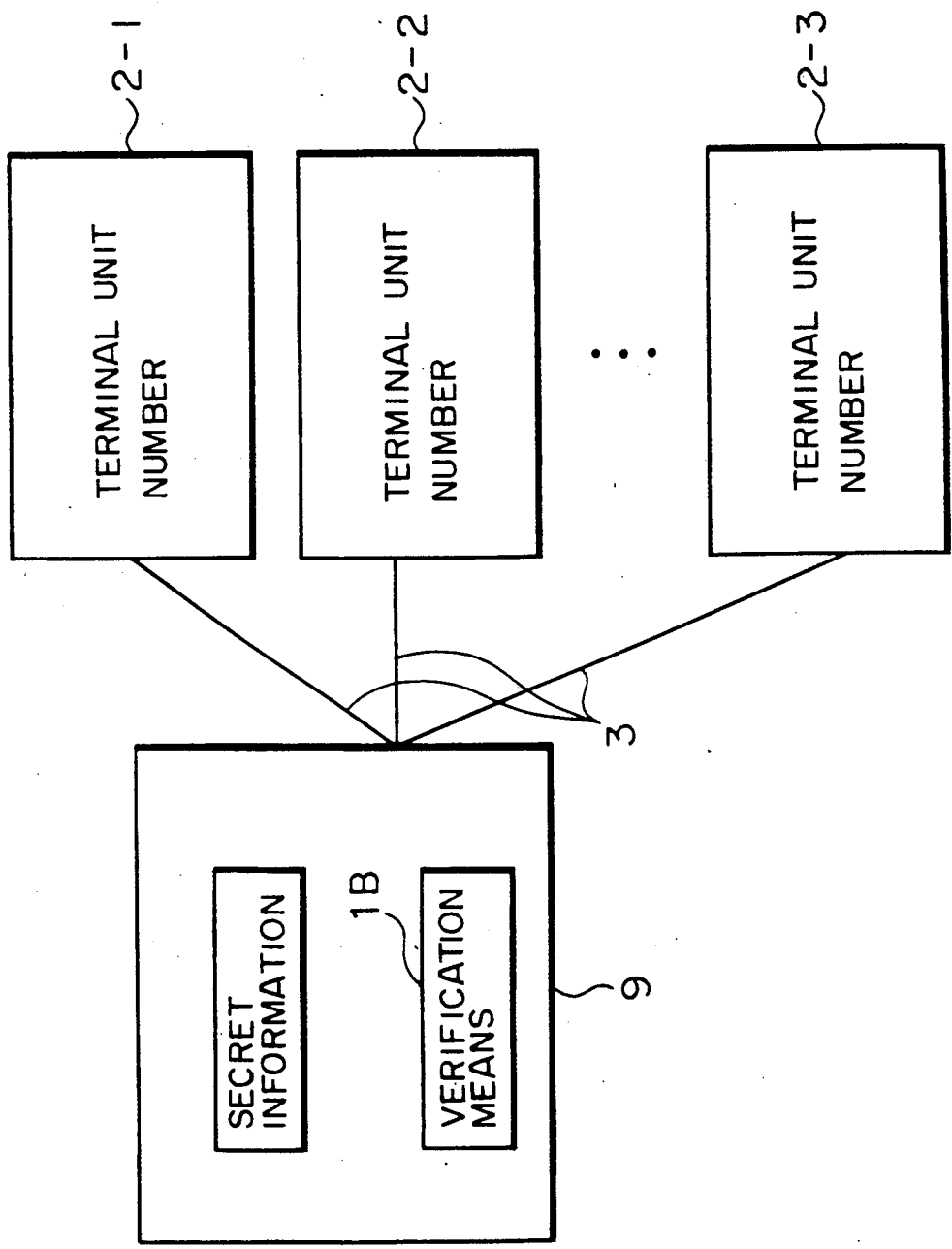
FIG. 11 is a block diagram showing an outline of the fifth to seventh inventions.
Figure 12:
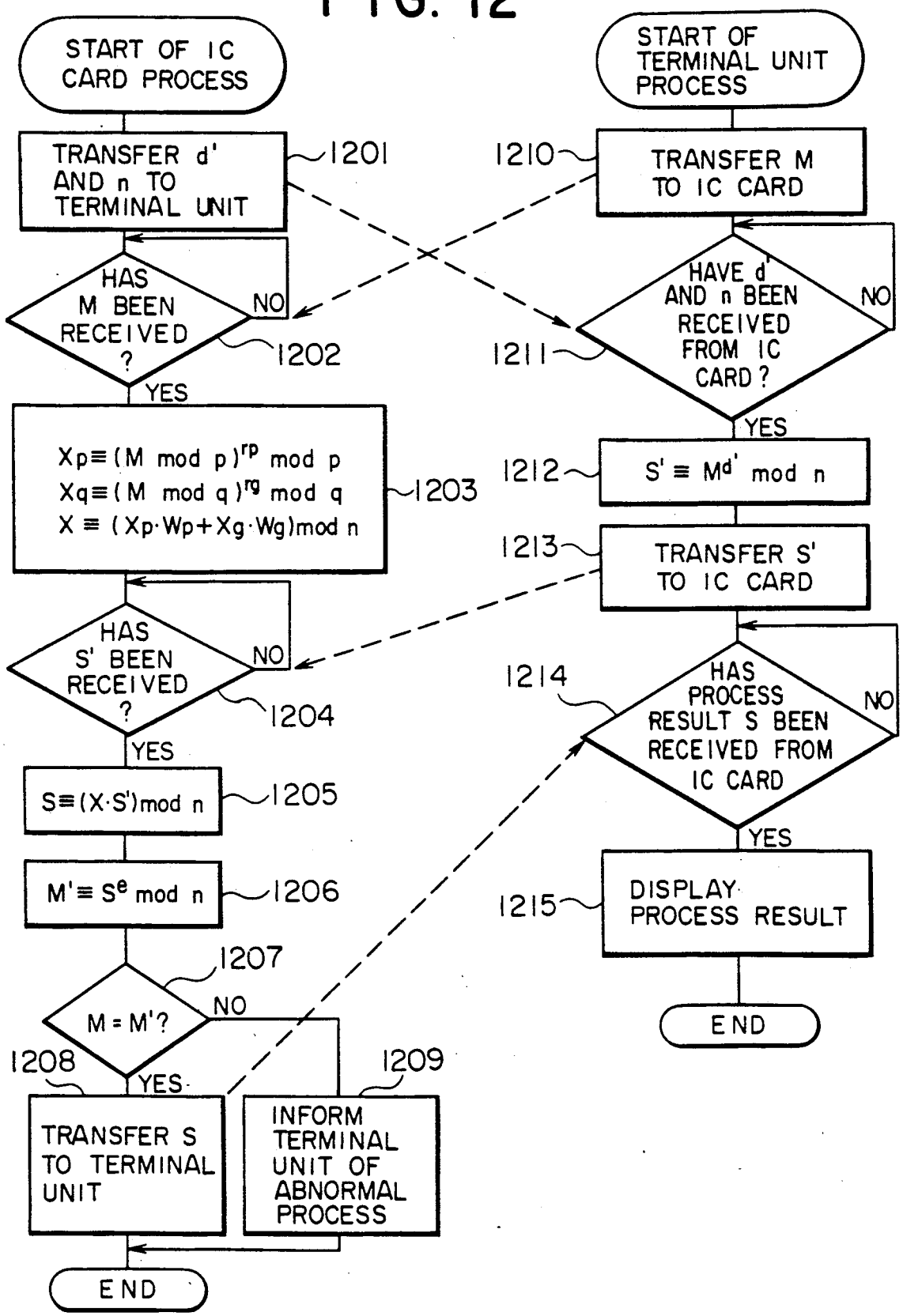
FIGS. 12 and 13 are a process flow chart embodying the fifth invention and an outline diagram showing the general structure.
Figure 13:
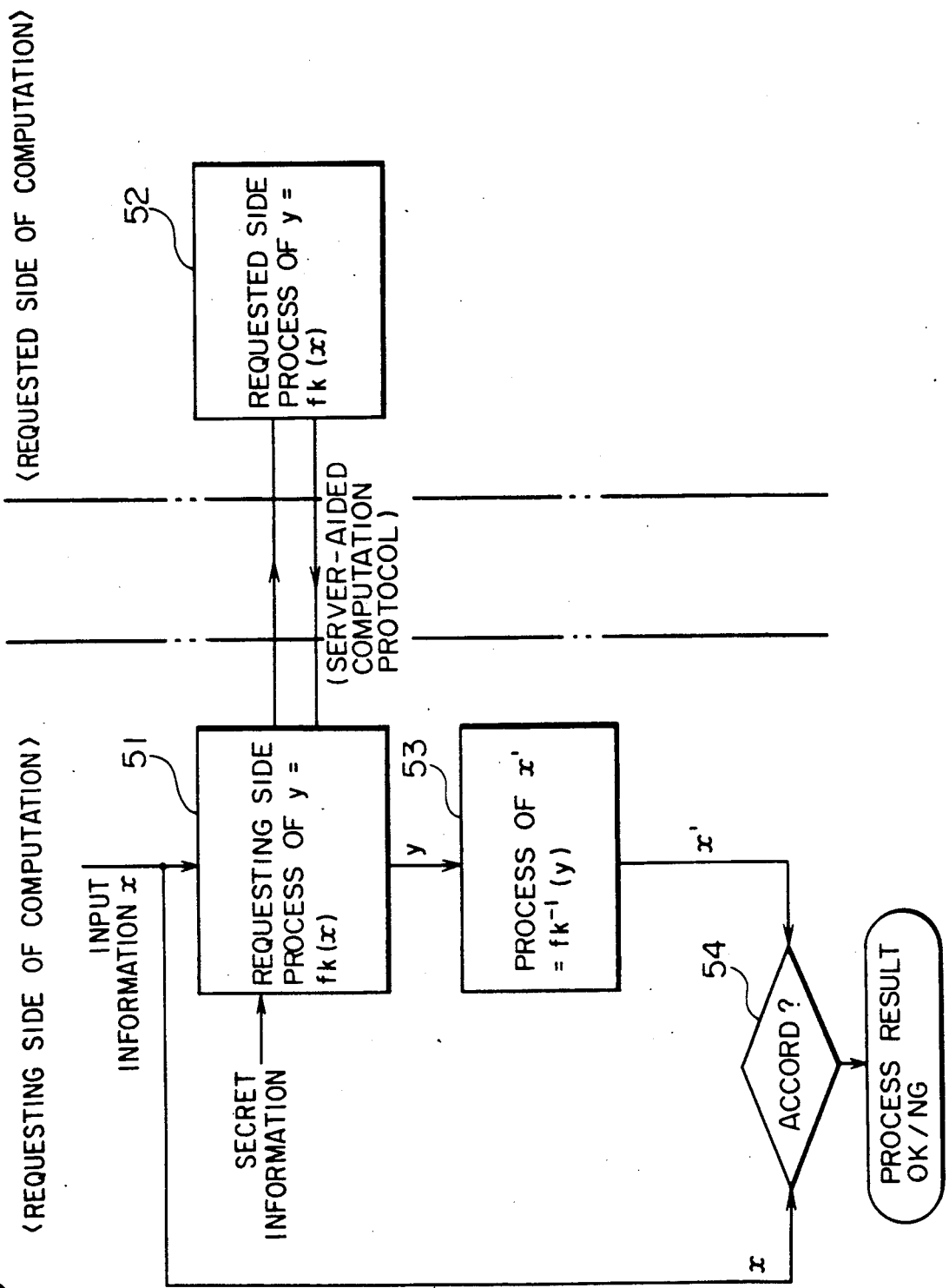

FIG. 11 is a block diagram showing a system composed of the IC card 9 and the auxiliary unit. FIGS. 12 and 13 are a process flow chart embodying the fifth invention and an outline diagram showing the general structure, respectively.

In the IC card 9, deciption keys of the RSA cryptosystem have been stored. Now, assume that the keys are d, n, p, and q where p and q are large prime numbers which are kept secret to the outside except for the IC card 9. The open modulus n is the product of p and q. d is a secret exponent. The exponent e and the modulus n which structure the open keys may be open to the requested side of the computation.

The IC card 9 is provided with verification means IB.

The IC card 9 requests the terminal unit 2 to execute the deciption conversion or generate a signature without divulging the secret key d. By a proper server-aided computation method, the requested side of the computation obtains the message M which has been converted and the message S of the computation result. When the conversion has been validly executed on the requested side of the computation, it is necessary to satisfy the following equation.

$$M = S^e \bmod n \quad (83)$$

To check the equation, when generating the keys, it is necessary to consider the creation method of the open exponent e.

As well known, when $L = LCM \ (p-1, q-1)$ is defined, the value of e can be freely decreased without degrading the safety, if e and L are relatively prime.

The IC card 9 computes M, which satisfies the following equation using S as the result of the server-aided computation in step 1206. This computation can be executed by the IC card 9 at a satisfactorily high speed because the value of e is small.

$$M' = S^e \bmod n \quad (84)$$

Then, M' obtained in step 1207 is compared with the former message. When both of them are matched, it can be determined that the computation by the terminal unit 2 has been validly executed.

In the server-aided computation method relating to the conversion $f_k$ according to the secret information k, when the requesting side of the computation can easily execute the reverse conversion $f_k^{-1}$, this method can be generally applied to any other server-aided computations as well as the RSA cryptosystem. FIG. 13 shows the system structure where the server-aided computation method is generally extended.

In FIG. 13, the requesting side of the computation adds the secret information k to the input information x in a first process section 51, computes $y = f_k (x)$ with an assistance of a process section 52 on the requested side, solves $x' = f_k^{-1} (y)$ in a second process section 53, and compares x' with the input information x in a comparison section 54 so as to verify the process result.

Therefore, in this embodiment, since the input information x and the information x' obtained by the reverse conversion are compared in the comparison section 54, the server-aided computation can be really validated.

By referring to FIGS. 14 and 15, another embodiment of the fifth invention is described in the following. In this embodiment, a server-aided computation of a modulo-exponentiation in the Diffie - Hellman type key-in-common protocol is described as an example.

Firstly, the Diffie - Hellman type key-in-common protocol is described. When the key data is shared between the user A and the user B, the following process is executed.

As the preparation, it is necessary to generate for a user i a secret key $x_i$, compute the open key $p_i = g^{x_i} \mod p$, and open $p_i$ to the public where p is a prime number and g is a primitive root of the Galois field GF (p) which are common in all users. The user A obtains a common key $K_{AB}$ by the computation of the equation (85) using the open key $p_B$ of the user B and the own secret key $x_A$.

$$K_{AB} = p_B^{x_A} = g^{x_B \cdot x_A} \mod p \qquad (84)$$

The user B obtains the common key $K_{BA}$ by the computation of the equation (86) using the open key $p_A$ of the user A and the own secret key $x_B$.

$$K_{BA} = p_A^{x_B} = g^{x_A \cdot x_B} \mod p \qquad (86)$$

$K_{BA}$ accords with $K_{AB}$. In addition, it is difficult to obtain the secret key using the open key because it requires computing a discrete logarithm.

The above key-in-common protocol can be accomplished by executing the modulo-exponentiation $p_B^{x_A} \mod p$ where the prime number p is the modulus.

Next, the server-aided computation protocol of a modulo-exponentiation where the prime number p is the modulus is described in the following. Assume that the requesting side of the computation is the IC card 9 and the requested side is the terminal unit 2 which has higher computation capacity than the IC card 9. The IC card 9 has stored a fixed secret key x. The base g which is the open key and the modulus p which is a prime number are known by both the requesting side and the requested side of the computation.

The IC card separates the secret key x as expressed in the equation (87). This process can be executed by the IC card itself or the center as a key issuance process. In addition, it is also possible to store this process in the IC card as secret information.

$$x = x_0 + f_1 x_1 + f_2 x_2 + \ldots + f_m x_m \mod p - 1 \qquad (87)$$

where fi is 0 or 1 and $x_0$ is a small value.

$F = [f_1, f_2, \ldots, f_m] D = [x_1, x_2, \ldots, x_m]$, and $x_0$ are named separated members of the key x.

These x, F, D, and $x_0$ are secret information of the IC card 9. The separation method of the key x is a modification of the method of the RSA-S1 protocol (proposed in the thesis of Matsumoto and Imai, "How to ask services without violating privacy", 1989 Encipherment and Information Security Symposium Text, February 1989).

Figure 14:
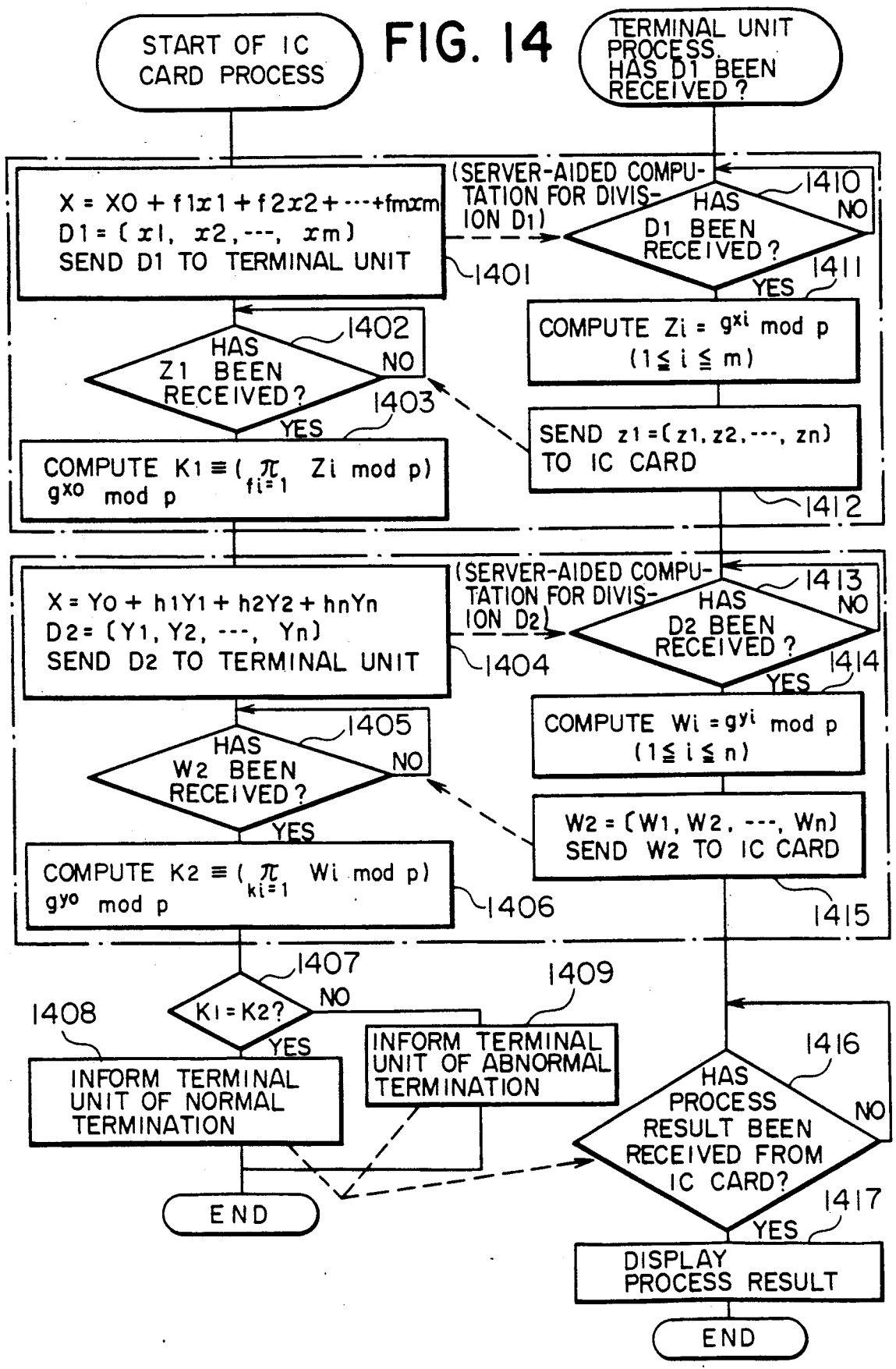
FIGS. 14 and 15 are a process flow chart and an outlined diagram of the general structural example of another embodiment.

The server-aided computation protocol using the key separation is shown in FIG. 14.

(1) The IC card 9 sends D to the terminal unit 2 (in step 1401).

(2) The terminal unit 2 receives the separated member $D_1$ in step 1410, computes $z_i$ ($1 \leq i \leq m$) of the following equation (88) in step 1411, and sends the resultant data $Z = [z_1, z_2, \ldots, z_m]$ to the IC card 9 in step 1412.

$$z_i = g^{x_i} \mod p \qquad (88)$$

(3) The IC card 9 receives Z1 in step 1402 and computes K ($K_1$) of the equation (89) in step 1403.

$$K = \left( \prod_{f_i = 1} z_i \mod p \right) \cdot g^{x_0} \mod p \qquad (89)$$
$$= g^x \mod p$$

$f_i$ is not limited to 0 and 1, but extensible to general positive integers.

In this embodiment, a method for determining whether the process of the terminal unit 2 has validly executed the server-aided computation of the modulo-exponentiation and for detecting the result if it is invalid is provided. As one example, a method for checking that signatures obtained by different separated members of keys used for the server-aided computation protocol are matched is described in the following.

(1) The IC card 9 creates two separated members which satisfy the equation (21) and names them $D_1$ and $D_2$.

(2) The IC card 9 executes the process of the server-aided computation using D and obtains the result $K_1$.

(3) The IC card 9 executes the process of the server-aided computation using $D_2$ in step 1404.

(4) The terminal unit 2 receives $D_2$ in step 1413, computes the following equation in step 1414, $W_i = g^{Y_i} \mod p$ ($1 \leq i \leq n$), obtains the following in step 1415, $W_2 = [W_1, W_2, \ldots W_n]$ and sends the result to the IC card 9.

(5) The IC card 9 receives $W_2$ from the terminal unit 2 in step 1405 and obtains the result $K_2$ in step 1406.

(6) The IC card 9 compares $K_1$ with $K_2$ in step 1407. When they are matched, the IC card 9 determines that the computation result is valid in step 1408. When they are not matched, the IC card 9 determines that the computation result is invalid in step 1409.

In the above process, it is possible to verify whether the terminal unit 2 has validly executed the process However, when two keys are separated, $x_0$ should be different between them. If they are not different, when the terminal unit 2 computes the equation (88) using g' as the base rather than g, the results $K_1$ and $K_2$ are matched.

It is obvious that the result of the computation of the equation (88) using g as the base differs from that using g' as the base. The RSA-S1 protocol, which is the original form of the above protocol, is a method equivalent to $X_0 = 0$. In the method for verifying the computation result by executing the above method twice, an attack method using g' instead of g is present. Thus, $x_0$ is added as a separated member of a key.

The same result can be obtained by other methods as well as the method described in this embodiment. For example, the practical protocol can be generalized by increasing the number of the separated members to 3 or more. In addition, when computing $K_1$ and $K_2$, it is also possible to use a different server-aided computation method.

Figure 15:
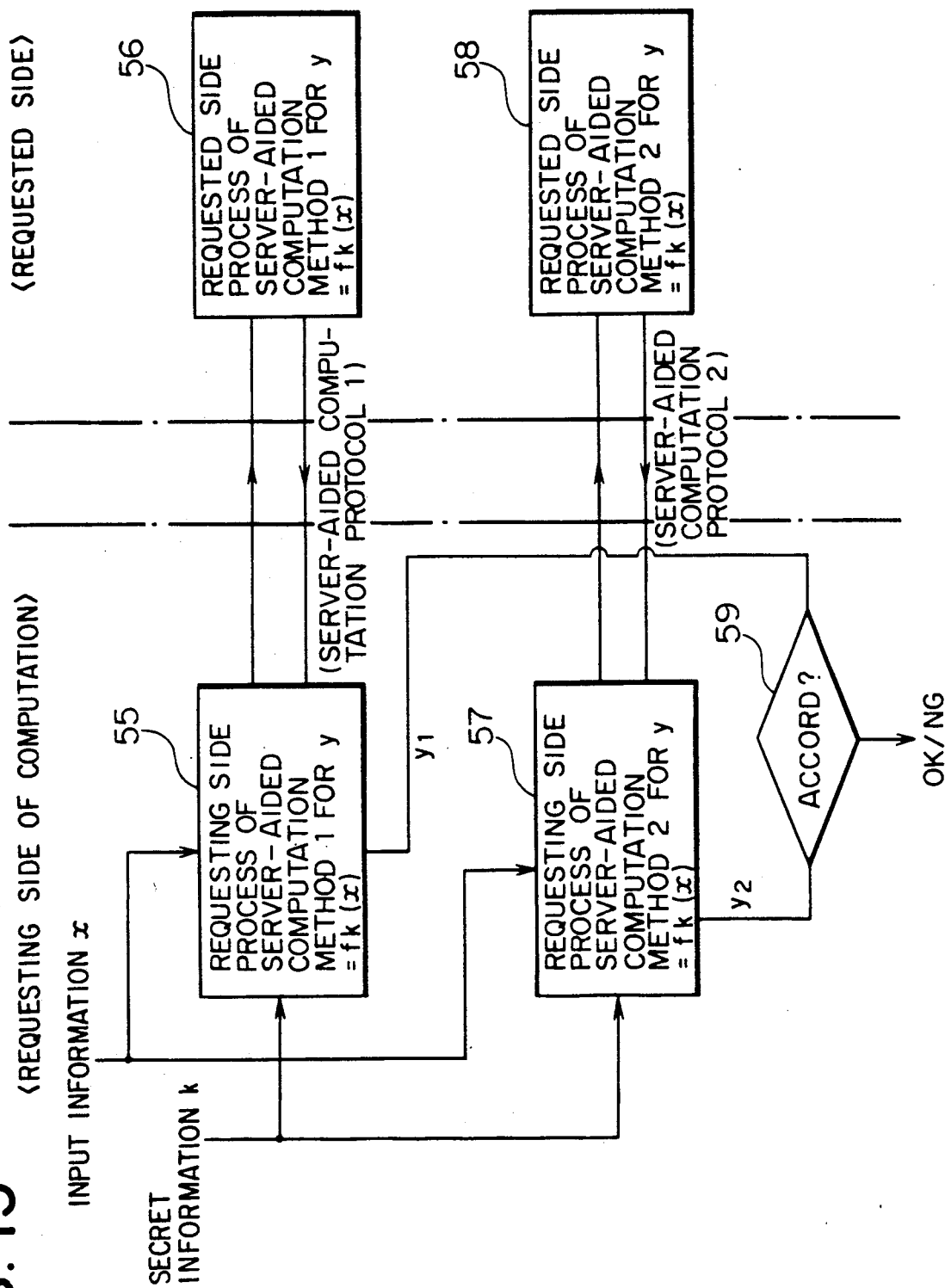

FIG. 15 shows a general structure of this embodiment.

(1) Using first process sections 55 and 56 on the requesting side and the requested side, respectively, the result $y_1$ is obtained.

(2) Using second process sections 57 and 58 on the requesting side and the requested side, respectively, the result $y_2$ is obtained.

(3) By comparing $y_1$ with $y_2$ in a comparison section 59 on the requesting side, when they are matched, it is determined that the result is valid. Otherwise, it is determined that the result is invalid.

An independent server-aided computation method which can be used for such compound type protocol can be selected from those which have been proposed.

Only the server-aided computation method for computing modulo-exponentiation necessary for the Diffie - Hellman type key-in-common protocol has been described. In a general server-aided computation, the validity of the computation result can be verified by the method described above. For example, for verifying the computation result of the RSA cryptosystem, it is possible to use the same method.

Figure 16:
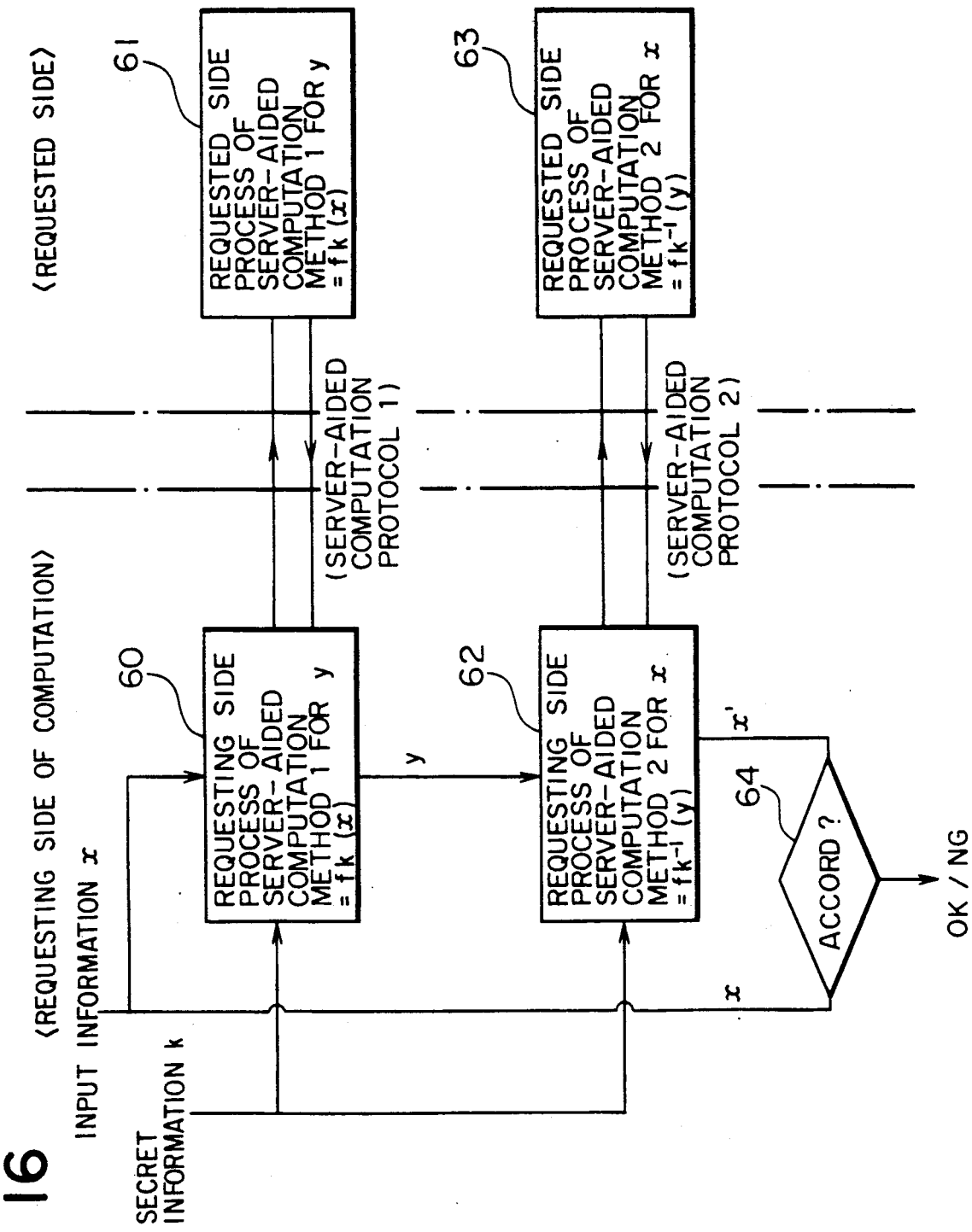
FIGS. 16, 17, and 18 are an outlined diagram of the general structural example, a flow chart of an example of the process, and a flow chart of another example of the process of another embodiment, respectively.

By referring to FIGS. 16 and 17, another embodiment is described in the following. The concept of the method described in the following is similar to that of the above embodiment. As outlined in FIG. 16, generally, when information which has not been converted and that which has been converted are x and y, respectively, in the server-aided computation method for the conversion $y = f_K(x)$ according to secret information k, the conversion process is executed in first process sections 60 and 61. When reverse conversion $f_K^{-1}$ is present, it is obtained by second process sections 62 and 63. A comparison section 64 verifies the fidelity of the requested side of the computation using the reverse conversion by checking that $x' = f_K^{-1}(y)$ accords with x.

The outline of the protocol is as follows.

(1) x is converted using the server-aided computation of the forward conversion and the requesting side of the computation obtains y.

(2) y is converted using the server-aided computation of the reverse conversion and the requesting side of the computation obtains x'.

(3) The requesting side of the computation compares x with x' and when they are matched, it determines that the result y is valid.

However, in the first embodiment, the reverse conversion was applicable only when it could be easily executed on the requesting side. However, in this embodiment, the reverse conversion is applicable, even if the reverse conversion cannot be executed only by the requesting side. To accomplish that, in this embodiment, the server-aided computation is also applied to the reverse conversion.

The structures of practical forward and reverse server-aided computations should be considered depending on individual applications.

It is necessary to note that the information necessary for the reverse server-aided computation is transferred to the outside of the unit on the requesting side of the computation as well as that necessary for the forward server-aided computation. Thus, the protocol should be structured in the manner that the secret information k is not divulged to the outside except for the requesting side even if the two types of information are combined. In addition, generally, the requested side sends information back to the requesting side one time each for the forward server-aided computation and the reverse server-aided computation. In total, the information is sent two times. When the information which is sent two times is not that which is not obtained in the valid process, the protocol should be structured so that the protocol does not allow the information to be passed to the last verification.

Using an example of the server-aided computation of the RSA cryptosystem, it is possible to represent that the practical protocol can be structured. The protocol that follows is available when the computation load of the reverse conversion is large, namely, the open exponent e is large.

Figure 17:
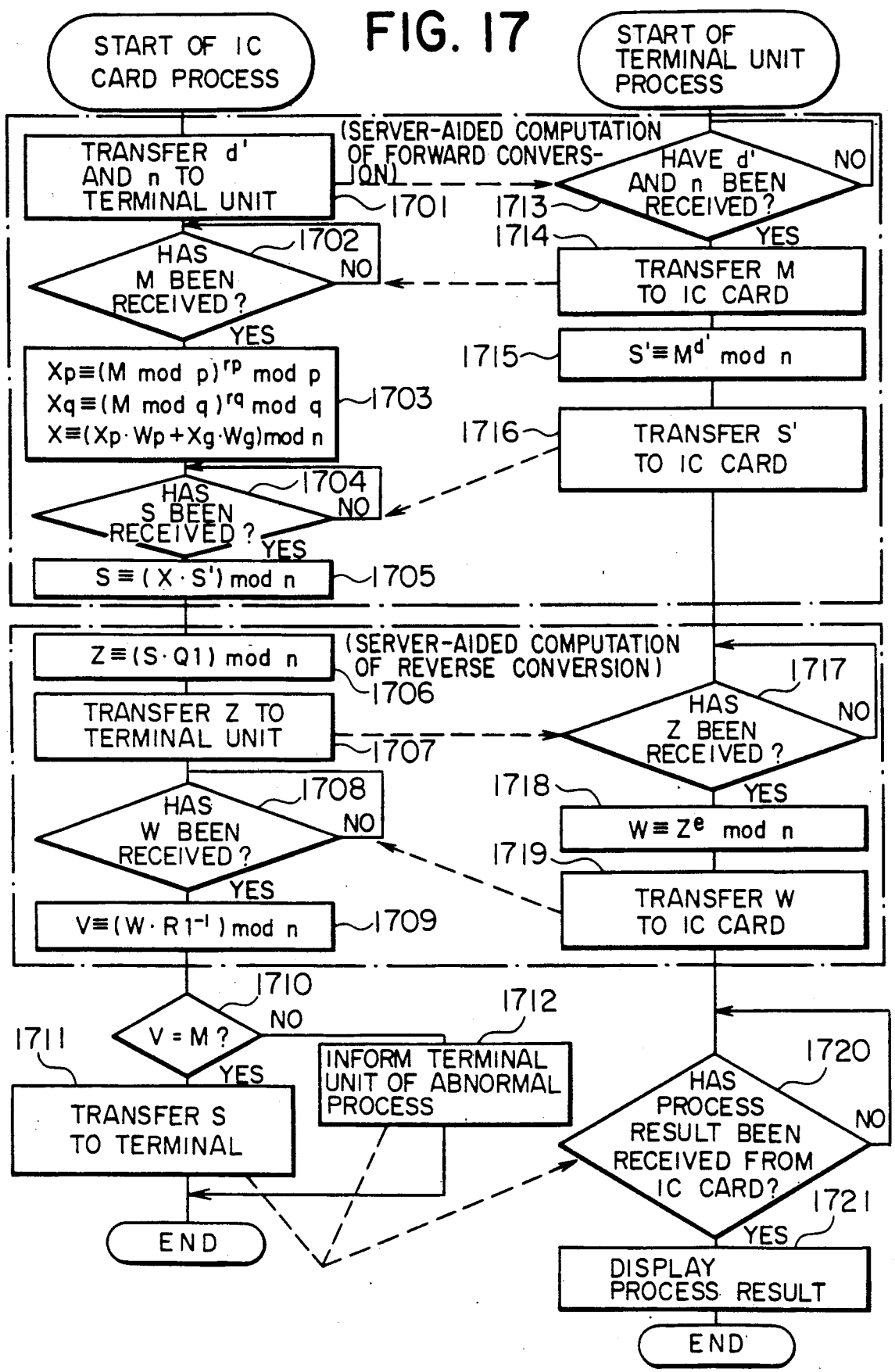

Like the embodiments described above, assuming that the requesting side of the computation is the IC card 9 and the requested side of the computation is the terminal unit 2 which has a higher computation capacity that the IC card 9, a practical example of the process is shown in FIG. 17.

The IC card 9 has stored own fixed decipher keys d, n, p, and q of the RSA cryptosystem where p and q are kept secret to the outside except for the IC card 9, d is a secret exponent, and the exponent e and the modulus n which structure the open keys may be open to the requested side of the computation. The server- aided computation method described in the above embodiment is practically exemplified in the following.

The IC card 9 knows a random number $R_0$ which satisfies the following conditions and which is kept secret to the terminal unit 2.

(1) $r_p = R_0 \mod (p-1)$,
(2) $r_q = R_0 \mod (q-1)$, and
(3) The value of $\chi(r_p) + \chi(r_q)$ is relatively small.

The IC card 9 sends d' and n which have been computed from the equation $d' = (d - R_0) \mod L$ to the terminal unit 2 (in step 1701). The terminal unit 2 receives them in step 1713, computes the equation $S' \equiv M^{d'} \mod n$ in step 1715, and sends the result to the IC card 9 in step 1716. The IC card 9 receives S' in step 1704 and obtain S from $S \equiv M^R \cdot S' \mod n$ in step 1705. The above process is the forward server- aided computations.

On the other hand, the IC card 9 has computed $Q = R_1^d \mod n$ using another random number $R_1$ and the modulus n. The computation load for computing $Q_1$ from $R_1$ is large. However, to reduce the computation load, it is possible to compute $Q_1$ in advance using a non- busy time of the CPU 15 of the IC card 9. When a plurality of random numbers and sets of their powers are generated in the non-busy time, signatures can be successively generated (or cipher texts can be successively deciphered). The set of $R_1$ and $Q_1$ can be also generated in the manner that firstly $R_1 = Q_1^e \mod n$ and $Q_1$ have been generated and then $R_1$ is assigned.

A procedure for the reverse server-aided computation for determining the validity of S obtained as the result of the forward server-aided computation is described in the following.

(1) The IC card 9 computes the product of S and Q1, which is $Z \equiv (S \cdot S1) \mod n$ in step 1706 and sends Z to the terminal unit 2 in step 1707.

(2) The terminal unit 2 receives Z in step 1717, computes $W \equiv Z^e \mod n$ using the open exponent e in step 1718, and sends the result to the IC card 9 in step 1719.

(3) The IC card 9 receives the result in step 1708 and computes $V \equiv (W / R1) \mod$ in step 1709.

(4) The IC card 9 compares V with M in step 1710 and when they are matched, it determines that the result S of the forward server-aided computation is valid.

In the following, the reason why the steps (1) to (4) above allows the validity of the forward server-aided computation to be determined is described.

In the step (4) of the reverse server-aided computation, to allow V to be matched with M, V=(W / R1) mod n should be satisfied, thereby W=M·R1 mod n. When W≠M·R1 mod n, it is determined that all the server-aided computation failed. In this protocol, the terminal unit 2 knows M. Thus, even if the forward server-aided computation failed, when the terminal unit knows R1 in the step (2), it may compute W=M·R1 mod n and cause the IC card 9 to generate an invalid signature. However, since the terminal unit 2 knows R1 only when it correctly executes the forward server-aided computation, the validity of the forward server-aided computation can be determined in the above process.

Figure 18:
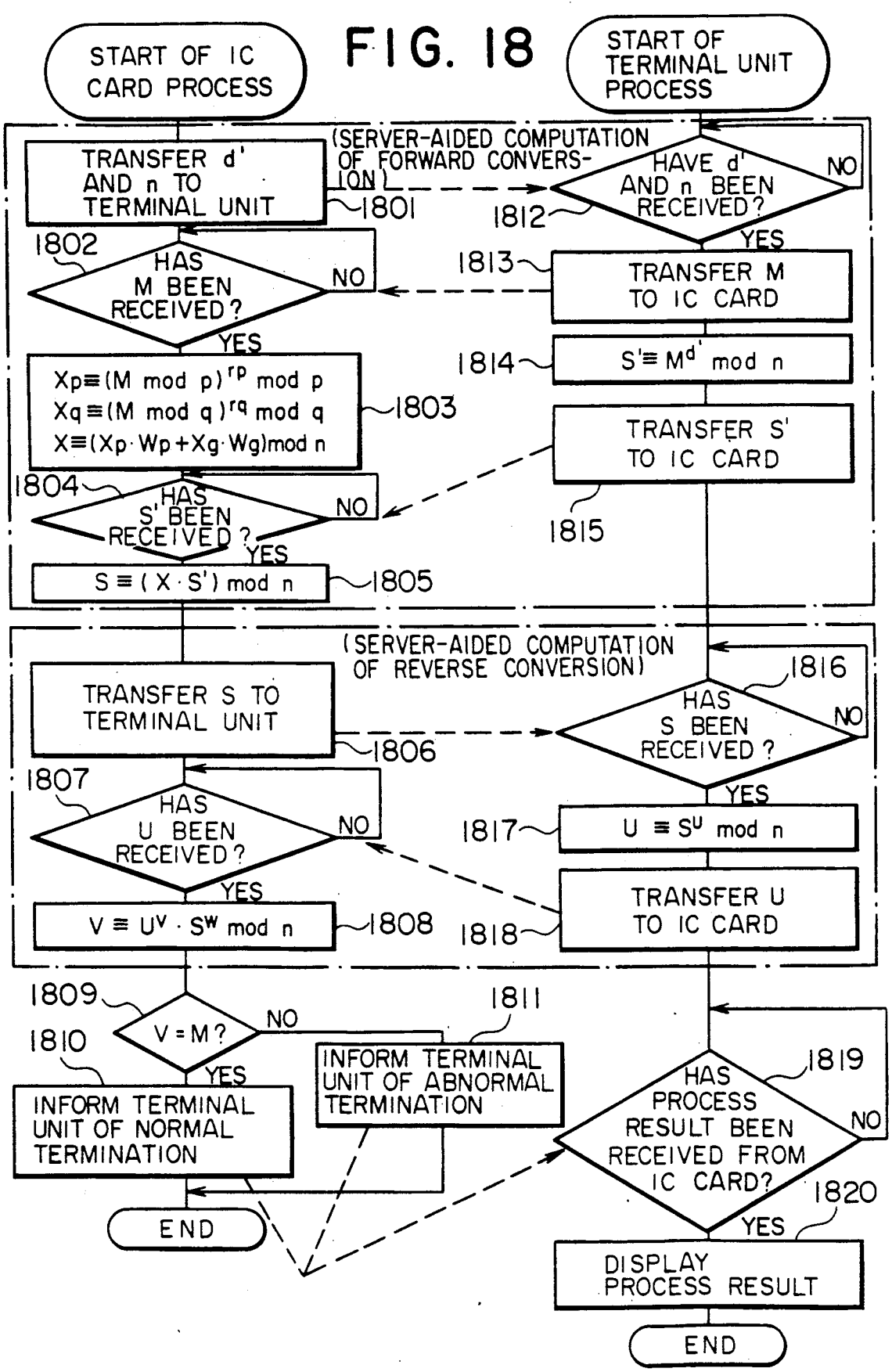

By referring to FIG. 18, a third embodiment is described in the following. This embodiment can be applied to verify a signature of the RSA cryptosystem being generated. The concept is that the verification of the forward server-aided computation is performed using the server-aided computation of the reverse conversion like the embodiment shown in FIG. 12.

The IC card 9 has obtained u, v, and w which satisfy the equation (90) using the open exponent e in advance.

$$e = u \cdot v + w \quad (90)$$

(1) The IC card 9 requests the terminal unit 2 to generate a signature without divulging the secret key d to the terminal unit d. At the time, the parameter w of the equation (90) should satisfy the following two conditions. (Condition 1) W≠0 (Condition 2) e·d'0 are not divided by w.

(2) The IC card 9 sends S which has been obtained as the result of the server-aided computation for generating the signature in (1) to the terminal unit 2 in step 1806.

(3) The terminal unit 2 receives S in step 1816, obtains U of the equation (91) where S is raised to the u-th power in step 1817, and sends U to the IC card 9 in step 1818.

$$U = S^u \bmod n \quad (91)$$

(4) IC card 9 receives U in step 1807 and computes V of the following equation (92) in step 1808.

$$V = U^v \cdot S^w \bmod n \quad (92)$$

(5) The IC card determines whether V and the plain text M are matched in step 1809. When they are matched, the IC card 9 determines that S is the valid signature. Otherwise, the IC card 9 determines that invalid computations have been executed.

Consequently, since $V = S^{uv+w} = S^e$ mod n is satisfied, when the terminal unit 2 has correctly executed the computation, $S = M^d$ mod n is obtained, thereby $V = S^e = M^{de} = M$.

If the terminal unit 2 has not validly executed the computation in the step (1) above and it has obtained S is not valid S, it is necessary to consider whether the terminal unit 2 can obtain U which is passed only to the last verification.

$M = U^v \cdot S^w$ mod n is the last verification equation. Although $S^w$ can be obtained by the terminal unit 2, it is necessary to lastly obtain U which satisfies $U^v = M / S^w$ mod n. Namely, v-th root in the modulus n should be obtained. Consequently, it is difficult to obtain U which can pass only the last verification equation.

When the two conditions for W have not been satisfied, it is possible to change the structure in the manner that only the last verification equation is passed without obtaining the v-th root in the modulus n.

In addition, in the steps (3) to (5), the secret information of the IC card 9 has not been used. Thus, unless the secret information of the IC card 9 is divulged by the server-aided computation protocol for generating the signature used in the step (2), the secret information is never divulged. Since it is possible to consider that only the step (2) prevents the secret information from divulging, the secret information is never divulged through these steps.

In these steps, V=3 and W=2 can be set depending on the value of the open key e. In this case, the computation amount that the IC card 9 executes becomes minimum and the modulo-multiplication is executed four times. Thus, when the value of the open key e is large, the process time can be beneficially reduced.

By referring to FIG. 19, another embodiment is described in the following.

The IC card 9 has created secret information t which is used in the server-aided computation for the reverse conversion in advance. Although t is a random number, it is restricted to the condition where the value of $\chi(t_p) + \chi(t_q)$ is small as to effectively execute the verification where $t_p$ and $t_q$ are values defined in the following equations (93) and (95). These conditions are the same as those used in the server-aided computation of the above embodiment.

$$t_p = t \bmod (p-1) \quad (93)$$

$$t_q = t \bmod (q-1) \quad (95)$$

Figure 19:
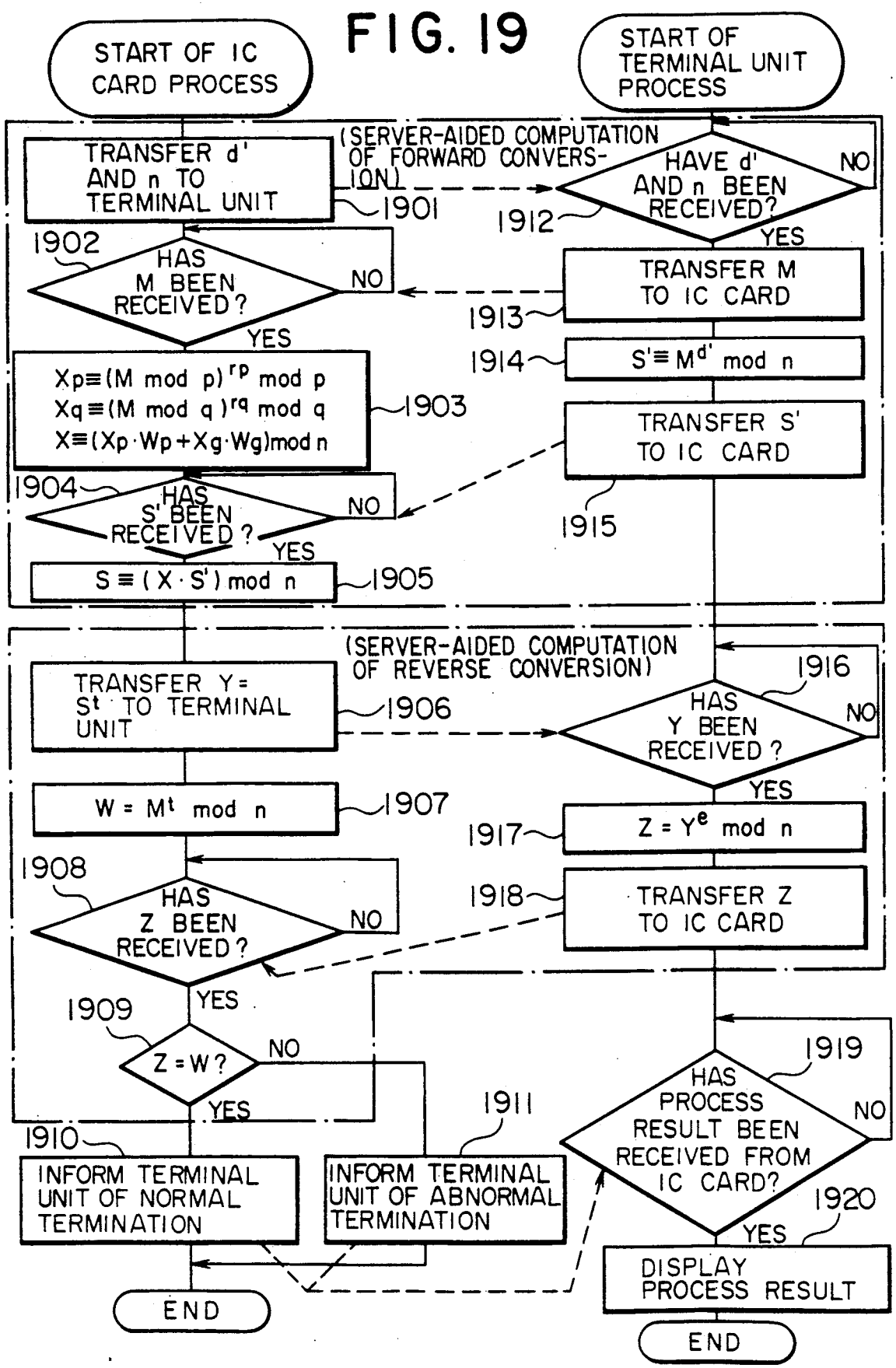
FIGS. 19 and 20 are flow charts showing another embodiment.

As shown in FIG. 19, assume that the IC card 9 and the terminal unit 2 have obtained the signature text S in accordance with steps 1901 to 1905 and steps 1912 to 1915, respectively. To verify the validity of the signature text S, the IC card 9 and the terminal unit 2 execute steps 1906 to 1909 and steps 1916 to 1918, respectively.

(1) The IC card 9 computes $Y = S^t$ mod n in step 1906 and transfers Y being computed to the terminal unit 2.

(2) The terminal unit 2 receives Y in step 1916, computes $Z = Y^e$ mod n using the open keys e and n in step 1917, and transfers Z being computed to the IC card 9 in step 1918.

(3) The IC card 9 computes $W = M^t$ mod n in step 1907 and receives Z being computed in step 1918 from the terminal unit 2 in step 1908.

(4) The terminal unit 2 determines that Z=W in step 1909 and advances to step 1901. When determined that Z≠W in step 1909, the terminal unit 2 determines that the steps being executed are invalid, advances to step 1910, and informs the user of the invalidity.

The modulo-multiplication method of the steps (1) and (3) is supplemented in the following. Although $Y = S^t$ mod n is computed in the modulus n, the multiplication should be executed approximately $\log_2 t$ times. When the equation is computed by dividing it into two modulo-exponentiations relating to two prime numbers p and q structuring the modulus n according to the Chinese remainder theorem, the computation time can be reduced.

In addition, the number of times of computing the multiplication in the modulus p is $\chi(t_p)$ and that in the modulus q is $\chi(t_q)$. When t is selected, if the condition where the value of $\chi(t_p)+\chi(t_q)$ is small has been imposed, the computations of the modulo-exponentiations of the steps (1) and (3) can be effectively executed by a unit with small computation capacity such as the IC card 9.

When t is selected to a small value, although the computation load of the IC card 9 is reduced, the IC card 9 becomes weak against attacking the estimation of t in the round robin method. Thus, it is necessary to increase the value of t to some extent.

In the embodiment in FIG. 19 shows a case where this verification method is associated with a special server-aided computation. However, this verification method is not limited to the special server-aided computation method.

In this verification method, when the open exponent e is a composite number, the reliability of the verification may degrade.

For example, assume that e is the product of two integers a and b, namely, e=a·b.

If the terminal unit 2 invalidly changes the server-aided computation result S to $S'=S^a \bmod n$, the terminal unit 2 correspondingly computes $Z'=Y^b \bmod n$ in the step (2) of the above verification rather than computing $Z'=Y^b \bmod n$. In this case, since Z' that the IC card 9 has obtained becomes $M^t$ from the deformation of the following equation, the terminal unit 2 succeeds in passing the verification.

$$\begin{aligned} Z' &= Y^b \bmod n \\ &= S'^{tb} \bmod n \\ &= S^{atb} \bmod n \\ &= (S^{ab})^t \bmod n \\ &= S^{et} \bmod n \\ &= M^t \bmod n \end{aligned}$$

This attack method succeeds only when e is a composite number, the factorization in prime factors is known, and the result of the server-aided computation can be changed so that $S'=S^a \bmod n$ is satisfied. Thus, when a prime number is selected for e, this attack method fails and the verification becomes effective. Even if e is a prime number, the degree of safety of the RSA cryptosystem does not degrade.

Next, another embodiment is described in the following.

The protocol that follows is valid only when the computation load in the reverse conversion is large to some extent, namely, the value of the open exponent e is large. This method is used to prevent the Hastad's attack in simultaneous transmission (J. Hasted, "On using RSA with low exponent in a public key network", Crypto 85, pages 403–408, 1985), to increase the value of e more than that of logn as to allow any plain text to be folded in the modulus n more than one time, and to become the open exponent e common in all the users by defining the quartic Fermat's number $(=2^{16}+1)$ to e.

Figure 20:
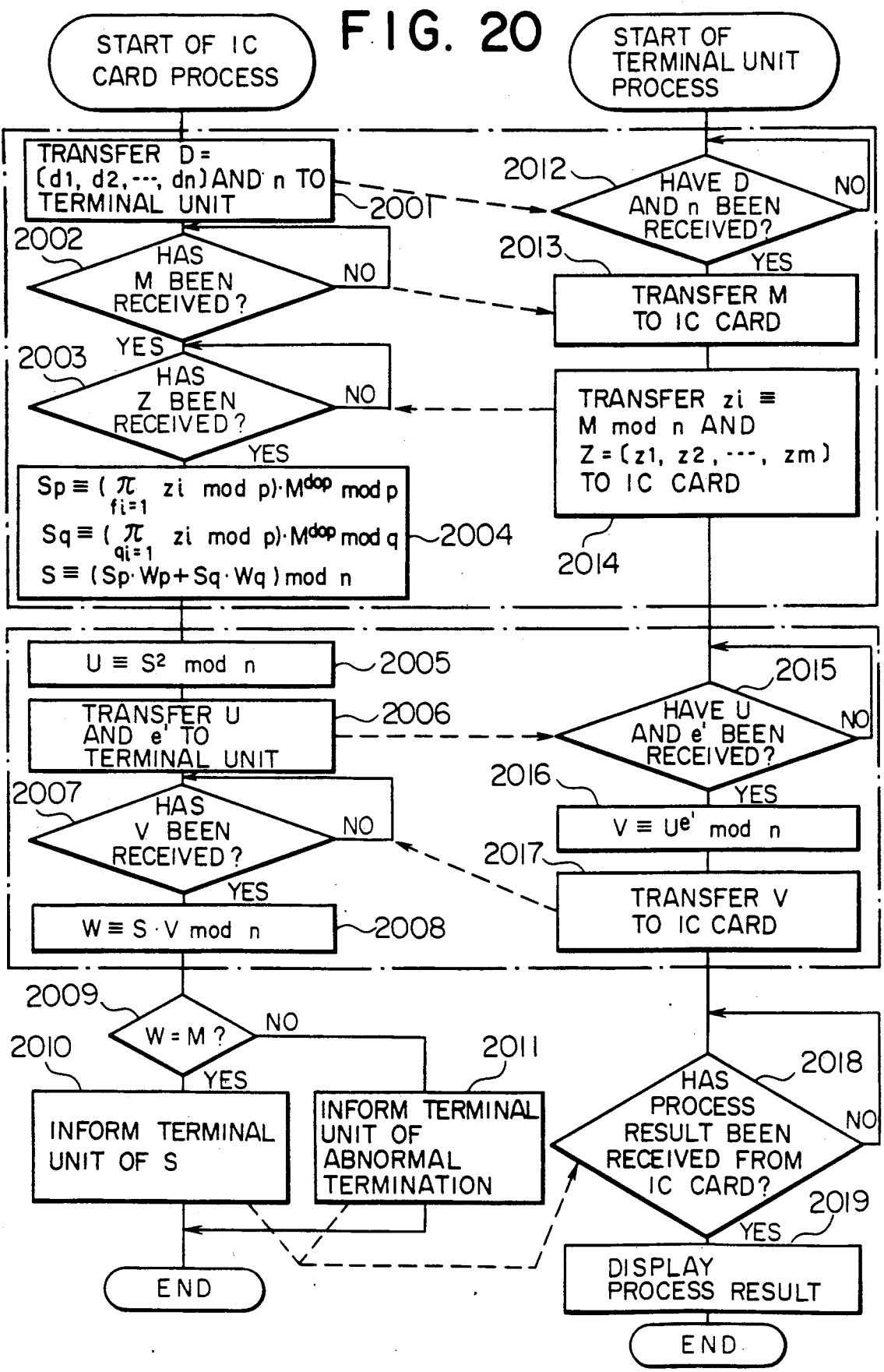

By referring to FIG. 20, a protocol which uses a server-aided computation method which is a modification of the RSA-S2 protocol (proposed in the thesis of Matsumoto and Imai, "How to ask services without violating privacy", 1988 Encipherment and Information Security Symposium Text, February 1988) is described in the following.

[1] The IC card 9 obtains the converted result S of the plain text M in accordance with the following protocol without transferring the secret key d to the terminal unit 2.

(1) The IC card 9 separates the secret key d as expressed in the following equations.

$$d \equiv d_{op} + f_1 d_1 + f_2 d_2 + \ldots + f_m d_m \bmod p-1$$

$$d \equiv d_{op} + g_1 d_1 + g_2 d_2 + \ldots + g_m d_m \bmod q-1$$

$$D = [f_1 f_2 \ldots d_m],$$

$$F = [f_1 f_2 \ldots f_m],$$

$$G = [g_1 g_2 \ldots g_m],$$

where

F and G are binary values. (Generally, $f_i$ and $g_i$ can be positive integers) However, the expression Weight (F) + Weight $(G) + \chi(d_{op}) + \chi(d_{op}) \leq L$ should be satisfied (where L is a parameter which is determined by the degree of safety).

d, $d_{op}$, F, and G are secret information of the IC card 9. As described below, since the terminal unit 2 cannot know $d_{op}$, $d_{oq}$, F, and G via the protocol, it cannot obtain the secret information d.

(2) The IC card 9 sends the modulus n and D to the terminal unit 2 (in step 2001).

(3) The terminal unit 2 computes the following equation and sends the plain text M and Z to the IC card 9 in step 2014.

$$Z_i = M^{di} \bmod n \ (1 \leq i \leq m)$$

$$Z = [z_1 z_2 \ldots z_m]$$

(4) The IC card 9 computes $S_p$ and $S_q$ of the following equations in step 2004.

$$S_p \equiv \left( \prod_{f_i=1} z_i \bmod q \right) \cdot M_{op}^d \bmod p$$

$$S_q \equiv \left( \prod_{g_i=1} z_i \bmod q \right) \cdot M_{oq}^d \bmod q$$

By combining $S_p$ and $S_q$ using the Chinese remainder theorem (CRT), the result S is obtained.

[2] The IC card 9 separates the open key e as expressed by the following equation.

$$e = 2 \cdot e' + 1$$

[3] The IC card 9 computes U of the following equation and sends U and e' to the terminal unit 2 in step 2005.

$$U \equiv S^2 \bmod n$$

[4] The terminal unit 2 computes V of the following equation in step 2016 and sends V to the IC card 9 in step 2017.

$$V \equiv U^{e'} \bmod n$$

[5] The IC card 9 computes W of the following equation in step 2008.

$$W \equiv S \cdot V \bmod n$$

[6] When W and M are matched in step 2009, the IC card 9 determines that S is a valid signature. When they are not matched, the IC card 9 detects in what part of the protocol an invalid process has been executed.

In evaluating the safety of the above method, when the terminal unit 2 has validly executed the computation, it is obvious that the IC card 9 determines that "the terminal unit 2 has validly executed the computation."

Then, it is necessary to consider whether the terminal unit 2 can pass the last verification and change S to an invalid signature or not. The verification equation of this embodiment is expressed as follows.

$$M \equiv S \cdot V \bmod n$$

Generally, to obtain V which satisfies the above equation, it is necessary to obtain the result S of the server-aided computation [1]. However, since the result S which has been raised to the second power is sent back, it is difficult to obtain S from the value being received. Although it may be possible to obtain the result S along with $S^2$ which is sent back [3] by properly selecting Z which is sent to the client in [1]-(3), it has not been known, thus far. The secret information which is newly added to the server-aided computation protocol for the verification is only the result S of the server-aided computation method [1]. All other information can be obtained by the terminal unit 2 alone. In the server-aided computation method [1], even if the result S is open to the public, it seems that the secret keys of the clients may be not divulged. Thus, it is supposed that the secret keys will not be divulged via [1] to [6].

On the other hand, in this embodiment, the computation load can be generalized by separating the open key e into the form of $u \cdot e' + v$. However, as described above, since e is an odd number, it is possible to set $u = 2$ and $v = 1$. In this case, the computation load of the IC card 9 necessary for the verification becomes minimum, namely, only twice multiplication in the modulus n. The communication data amount is around 1024 bits. Thus, for example, when e is a quartic Fermat's number, if the communication time and the server's process time are ignored, a high speed verification which is approximately 8 times that in the direct method can be accomplished.

In this embodiment, the feature is that the result S of the server-aided computation [1] is not transferred to the terminal unit 2. However, depending on the server-aided computation protocol type used in [1], it is possible to pass the verification protocol [2] to [6] described above. In other words, when the KS method described in the thesis "Secret Conversion of RSA Cryptosystem Using Server-Aided Computation" (1989 Encipherment and Information Security Symposium Text, February 1989), the method described in the thesis "How to ask services without violating privacy", (1989 Encipherment and Information Security Symposium Text, February 1989), or the RSA-S1/S2 protocol (ditto) is used in the server-aided computation section, if the terminal unit 2 can successively generate information to be sent back to the IC card 9 in (1), it can know the result S of (1) by using U of (3). (In the general form of $e = u \cdot e' + v$, when $(e, u) = 1$, for protocols except for the KS method, the signature can be stolen.) When the modified method of the S2 protocol is used, the same type of the attack method has not been known.

The modified method of the S2 protocol described in this embodiment contains both the KS method and the S2 method as a special case. In other words, the separation method of the secret information in the modified method accords with the S2 method when $d_{op} = d_{oq} = 0$ is satisfied in the following equations.

$$d \equiv d_{op} + f_1 d_1 + f_2 d_2 + \ldots + f_m d_m \bmod p - 1$$

$$d \equiv d_{oq} + g_1 d_1 + g_2 d_2 + \ldots + g_m d_m \bmod p - 1$$

On the other hand, when $f_i = g_i = 1$ is satisfied and other $f_i$ and $g_i$ are all 0, the modified method becomes the KS method. However, as described above, in the KS method, there is an attack method where a random result of the server-aided computation is sent back and the last verification equation is passed and thereby the terminal unit 2 can steal the signature.

Against the modified method, the same type of the attack method has not been known. Thus, it can be said that the modified method of this embodiment is superior to the KS method and the S2 method when also considering the verification.

From the fact described above, the meaning of the separation method of the secret information in the modified method can be explained. The terms $d_{op}$ and $d_{oq}$ prevent the signature from being stolen. The terms $f_1 d_1 + f_2 d_2 + \ldots + f_m d_m$ and $g_1 d_1 + g_2 d_2 + \ldots + g_m d_m$ prevent the attack method where a random result of the server-aided computation is returned and the last verification is passed.

In addition, in the modified method, the number of variables is greater than those of the KS method and the S2 method (in the KS method, two variables $d_{op}$ and $d_{oq}$ are used; in the S2 method, tow vector variables F and G are used; while in the modified method, four variables $d_{op}$, $d_{oq}$, F, and G are used). Thus, the parameters can be more flexibly selected depending on the process speeds of the IC card 9 and the terminal unit 2 than those of other methods. Assuming that the communication time between the IC card 9 and the terminal unit 2 can be ignored, when the process speed of the terminal unit 2 is very fast, in the S2 method, the process time can becomes the shortest. When the process time of the terminal unit 2 is relatively slow, the process time of the KS method is the shortest in these methods. The modified method described in the embodiment is in the middle position of the above two methods.

Then, an embodiment of the seventh invention is described in the following.

As described above, when the requested side of the computation has validly executed the conversion, the following equation (95) should be satisfied for M and S.

$$M = S^e \bmod n \qquad (95)$$

The IC card 9 separates the secret key d as expressed in the equations (96) and (97). In addition, the IC card 9 computes the equations $I = [i_1, i_2, \ldots, i_M]$ and $J = [j_1, j_2, \ldots, j_M]$ which satisfy the equations (98) and (99). This process can be executed by the IC card 9 or the center as the issuance process of the key or they can be also secretly stored in the IC card 9.

$$d = d_{op} + f_1 d_1 + \ldots + f_m d_m \bmod (p-1) \quad (96)$$

$$d = d_{oq} + g_1 d_1 + \ldots + g_m d_m \bmod (q-1) \quad (97)$$

$$1 = h_{op} + i_1 d_1 + \ldots + i_m d_m \bmod (p-1) \quad (98)$$

$$1 = h_{oq} + j_1 d_1 + \ldots + j_m d_m \bmod (q-1) \quad (99)$$

where $d_{op}$, $d_{oq}$, $h_{op}$, and $h_{oq}$ are small values. $D = [d_1, d_2, \ldots, d_m]$, $F = [f_1, f_2, \ldots, f_m]$, $G = [g_1, g_2, \ldots g_m]$, $I = [i_1, i_2, \ldots, i_m]$, $J = [j_1, j_2, \ldots, j_m]$, $d_{op}$, $d_{oq}$, $h_{op}$, and $h_{oq}$ are named separated members of the key d. These d, G, F, I, J, $d_{op}$, $d_{oq}$, $h_{op}$, and $h_{oq}$ become the secret information of the IC card 9.

Figure 21:
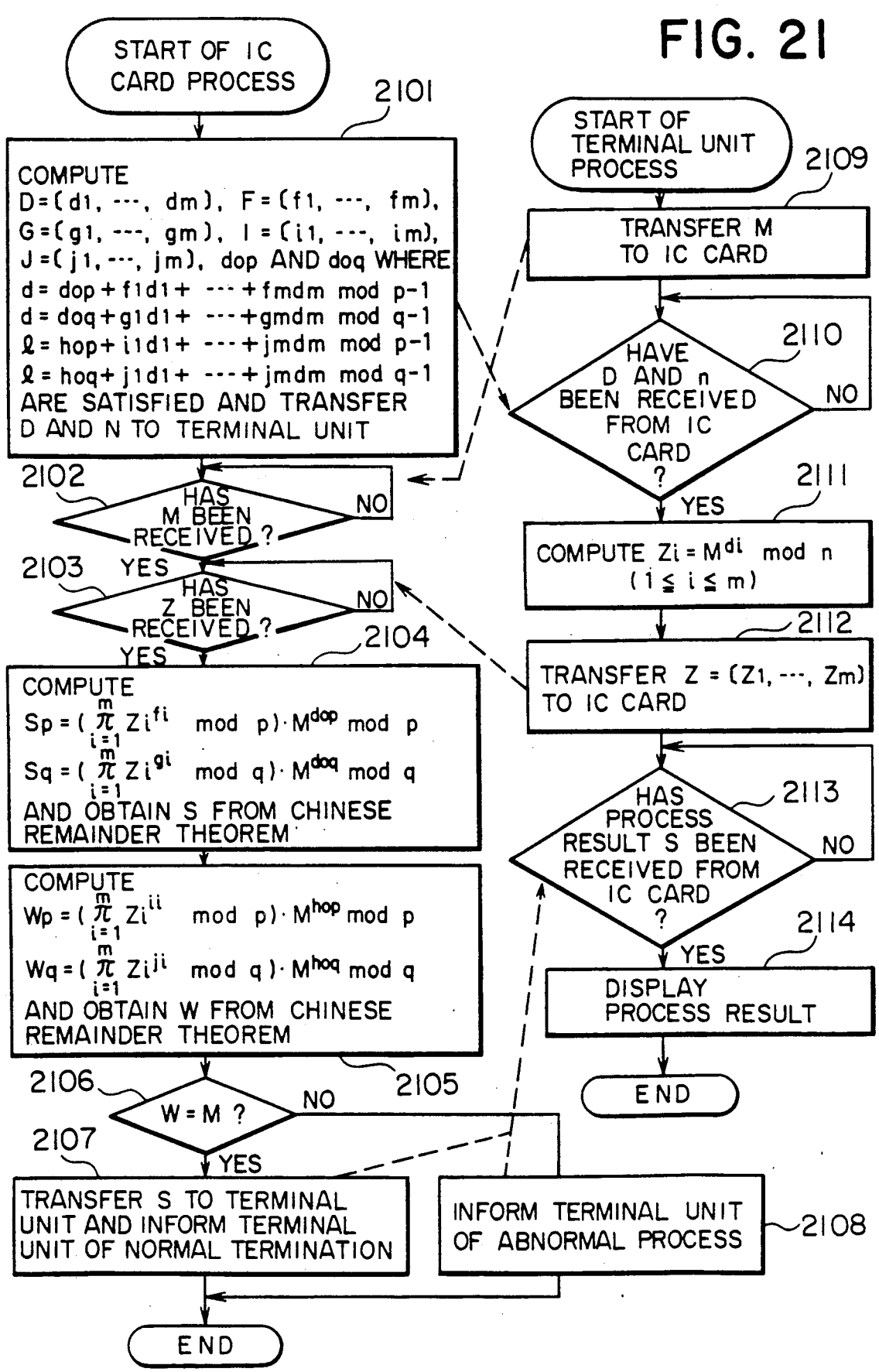
FIGS. 21 and 22 are a flow chart of the process and an outlined diagram of the general structural example of another embodiment, respectively.

The server-aided computation protocol including the verification function using the key separated members (signature generation using the RSA cryptosystem) is shown in FIG. 21.

(1) The IC card 9 sends D to the terminal unit 2 (in step 2101).

(2) The terminal unit 2 receives the separated members in step 2110, computes $Z_i = M^{d_i} \bmod n$ ($1 \leq i \leq m$) in step 2111, and sends the result $Z = [z_1, z_2, \ldots, z_m]$ to the IC card 9 in step 2112.

(3) The IC card 9 receives Z in step 2103 and computes the following equation using the separated members F, G, $d_{op}$, and $d_{oq}$ in step 2104. When the terminal unit 2 has not committed an invalidity, the result of the computation is expressed as follows.

$$\begin{aligned}
S_p &= \left( \prod_{i=1}^{m} z_i^{f_i} \bmod p \right) \cdot M^{d_{op}} \bmod p \\
&= M^d \bmod p \\
S_q &= \left( \prod_{i=1}^{m} z_i^{g_i} \bmod q \right) \cdot M^{d_{oq}} \bmod q \\
&= M^d \bmod q
\end{aligned}$$

Then, by using the Chinese remainder theorem, with $S_p$ and $S_q$, the signature is obtained.

When the values of $f_i$ and $G_i$ are limited to 0 and 1, the computation of $$\prod_{i=1}^{m} z_i^{f_i} \bmod q$$

can be executed without using powers.

Then, a method for determining whether the terminal unit 2 has validly executed its process as to determine the validity of the signature S is described in the following.

(1) In step 2105, the IC card 9 computes the following equation using Z, which has been received from the terminal unit 2 in step 2103, and the separated members I and J. When the terminal unit 2 has not executed an invalid computation, the result is expressed as follows.

$$\begin{aligned}
W_p &= \left( \prod_{i=1}^{m} z_i^{i_i} \bmod p \right) M^{h_{op}} \bmod p \\
&= M \bmod p \\
W_q &= \left( \prod_{i=1}^{m} z_i^{j_i} \bmod q \right) M^{h_{oq}} \bmod q \\
&= M \bmod q
\end{aligned}$$

Then, using the Chinese remainder theorem with $W_p$ and $W_q$, W is obtained.

(4) The IC card 9 compares M with W in step 2106. When they are matched, the IC card 9 determines the validity of the signature S (in step 2107). When they are not matched, the IC card 9 determines that S is invalid (in step 2108). In the above process, the IC card 9 can determine whether the signature S has been generated by the valid process of the terminal unit 2. When the signature S has been generated in the valid process of the terminal unit 2, the IC card 9 has place trust in the validity of S.

In evaluating the safety of the above process method, when the terminal unit 2 has validly executed the computation, it is obvious that the IC card 9 determines that "the terminal unit 2 has validly executed the computation."

Then, it is necessary to consider the possibility of a case where the terminal unit 2 can pass the last verification equation and change the result S to an invalid signature. Assume that $W = M$ is the last verification equation. W is generated by using the secret information I, J, p, q, $h_{op}$, and $h_{oq}$ which are known only by the IC card 9 in step 2105 in FIG. 21. The terms $h_{op}$ and $h_{oq}$ serve to prevent an attack method for passing the last verification equation when the terms of $i_1 d_1 + \ldots + i_m d_m$ and $j_1 d_1 + \ldots + j_m d_m$ are computed using a random server-aided computation result. Thus, it is difficult for the terminal unit 2 to obtain the separated member Z which passes the verification equation when a signature which is generated using Z which has been received by the terminal unit 2 is invalid.

In addition, the terminal unit 2 cannot know $d_{op}$, $d_{oq}$, F, and G via the protocol, it is impossible for the terminal unit 2 to know the secret information d.

The above separated members can be categorized as the following (1) to (4) depending on whether or not there are common portions between F and G and between I and J.

(1) When the term $h+1$ to the term k of F and G are the same as those of I and J, respectively:

$$F = \{f_1, \ldots, f_h, f_{h+1}, \ldots, f_k, 0, \ldots, 0\}$$

$$G = \{g_1, \ldots, g_h, g_{h+1}, \ldots, g_k, 0, \ldots, 0\}$$

$$I = \{0, \ldots, f_{h+1}, \ldots, f_k, i_{k+1}, \ldots, i_m\}$$

$$J = \{0, \ldots, g_{h+1}, \ldots, g_k, j_{k+1}, \ldots, j_m\}$$

(2) When the first k terms of F and I are the same as those of G and J, respectively and the values of the term $k+1$ to the term m of F and G are all 0:

$$F = \{f_1, \ldots, f_k, 0, \ldots, 0\}$$

$$G = \{g_1, \ldots, g_k, 0, \ldots, 0\}$$

$$I = \{f_1, ..., f_k, i_{k+1}, ..., i_m\}$$

$$J = \{g_1, ..., g_k, j_{k+1}, ..., j_m\}$$

(3) When the first k terms of F and I are same as those of G and J, respectively and the values of the term k+1 to the term m of I and J are all 0:

$$F = \{f_1, ..., f_k, f_{k+1}, ..., f_m\}$$

$$G = \{g_1, ..., g_k, g_{k+1}, ..., g_m\}$$

$$I = \{f_1, ..., f_k, 0, ..., 0\}$$

$$J = \{g_1, ..., g_k, 0, ..., 0\}$$

(4) When there are no same terms between F and G and between I and J:

$$F = \{f_1, ..., f_k, 0, ..., 0\}$$

$$G = \{g_1, ..., g_k, 0, ..., 0\}$$

$$I = \{0, ..., 0, i_{k+1}, ..., i_m\}$$

$$J = \{0, ..., 0, j_{k+1}, ..., j_m\}$$

Then, consider the method for generating the separated members of the above (1) to (4).

(1) is a general form which contains both common terms and non-common terms between F and G and between I and J. In this method, since the information necessary for the server-aided computation and the verification is transferred in one communication session, only the requesting side of the computation knows what terms are used for the verification. Although all the terms of Z necessary for generating the signature are not checked (in other words, when I and J are interpolated with Z, the product of the terms whose value is 0 in I and J and the corresponding terms in Z is 0. Thus, even if the terms in Z are invalidly changed, it cannot be determined), this method can satisfactorily prevent a sharpshooting which passes the verification equation even if zi is invalid by combining two pieces of information, for example, by changing terms which are not verified into invalid values or by separately sending and receiving the information for the server-aided computation and the information for the verification.

(2) allows all the terms of Z necessary for generating the signature to be checked, thereby preventing the sharpshooting described above in this separation method.

In (3), W which is compared with M for checking the validity is present during generating the signature. Thus, if Z is an invalid result, it is possible to check the validity of Z before obtaining the signature S. In addition, since an invalid signature is not generated, the computation load can be reduced. When the separated members are generated in such a manner, although all the terms of Z necessary for generating the signature are not checked, this method according to the present invention allows the sharpshooting described in (1) above to be satisfactorily prevented.

In (4), although all the terms are not checked, the method according to the present invention allows the sharpshooting described in (1) above to be satisfactorily prevented.

Figure 22:
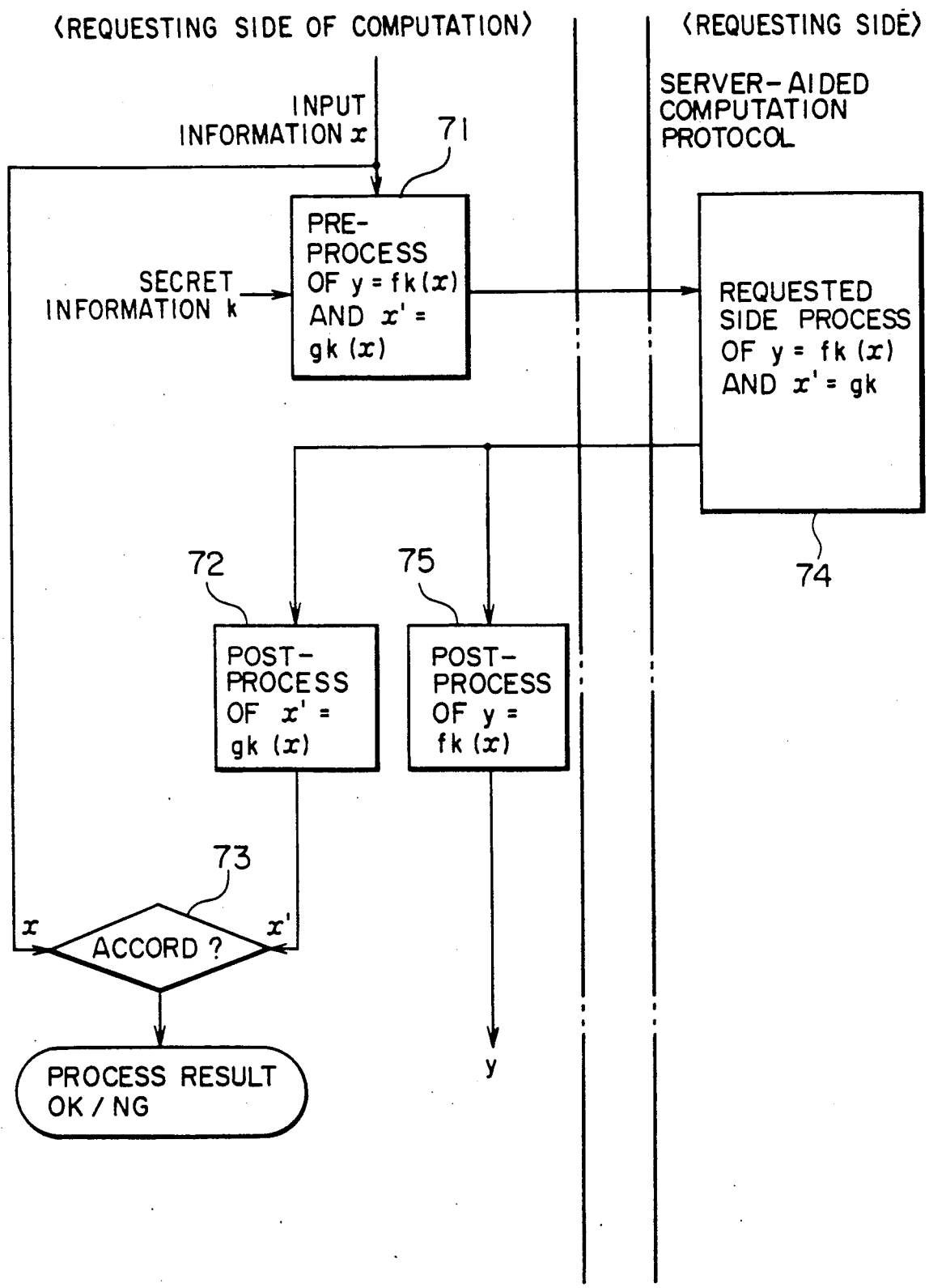

FIG. 22 shows a system structure which is generally extended.

In FIG. 22, the requesting side of the computation adds the secret information k to the input information x in a first process section 71, executes the pre-process of $y = f_k(x)$ and $x' = g_k(x)$ with an assistance of a process section 74 of the requested side, and obtains the process result in a third process section 75. After that, the requesting side executes the post-process of $x' = g_k(x)$ to obtain x in a second process section 72, compares $x'$ with x in a comparison section 73, and then verifies the process result obtained in the third process section 75.

Thus, in the seventh invention, the comparison section 73 compares the input information x with the information $x'$ obtained in the second process section 72 and checks the computation result.

Consequently, according to the fifth, sixth, and seventh inventions, when the conversion relating to secret information is executed separately by a plurality of units, the secret information is not divulged to other than a specific unit. In addition, the conversion is executed with an assistance of the computation capacity of the requested side. Moreover, since a disturbance of the computation committed by the requested side and/or the third party can be detected, the server-aided computation relating to the secret information can be much precisely executed.

What is claimed is:

1. A server-aided computation method for computing d-th power of integer C modulo n using a main unit for executing said computation with secret key d and at least one auxiliary unit for supporting a computation that said main unit executes, said method comprising the steps of:

generating d' from a secret key d using m random numbers $R_i$ (where i=1, ..., m) generated by said main unit having secret keys n and d;

transferring d' and n from said main unit to said auxiliary unit;

computing the following equation from a message block C in said auxiliary unit $$M' = C^{d'} \bmod n$$

computing X using said random numbers $R_i$ and n in said main unit while computing M' in said auxiliary unit;

transferring M' from said auxiliary unit to said main unit; and computing a message block M using the following equation in said main unit $$M = M' \cdot X \bmod n.$$

2. A server-aided computation method for computing d-th power of integer C modulo n using a main unit for executing said computation with secret key d and at least one auxiliary unit for supporting a computation that said main unit executes, said method comprising the steps of:

generating d' from a secret key d using m random numbers $R_i$ (where i=1, ..., m) generated by said main unit having secret keys n and d;

transferring d' and n from said main unit to said auxiliary unit;

computing the following equation from a message block C in said auxiliary unit $$M' = C^{d'} \bmod n$$

computing $X^{-1}$ using said random numbers $R_i$ and n in said main unit while computing M' in said auxiliary unit;

transferring M' from said auxiliary unit to said main unit; and computing a message block M using the following equation in said main unit $$M = m' \cdot X^{-1} \mod n .$$

3. A server-aided computation method for computing d-th power of integer C modulo n using a main unit for executing said computation with secret key d and at least one auxiliary unit for supporting a computation that said main unit executes, said method comprising the steps of:

generating d' from a secret key d using m random numbers $R_i$ (where i = 1, ..., m) generated by said main unit having secret keys n and d;

transferring d' and n from said main unit to said auxiliary unit;

computing the following equation from a message block C in said auxiliary unit $$M' = C^{d'} \mod n$$

computing X and $X^{-1}$ using said random numbers $R_i$ and n in said main unit while computing M' in said auxiliary unit;

transferring M' from said auxiliary unit to said main unit; and computing a message block M using M', X, and $X^{-1}$.

4. A server-aided computation method for executing a computation to raise a positive integer M to the d-th power modulo n, using a main unit which has secret information d and at least one auxiliary unit for supporting said computation, said method comprising the steps of:

(a) decomposing said integer n into k (k≧1) positive factors $n_j$ (where j = 1, ..., k), which are relatively prime to each other;

(b) decomposing said positive integer d into (m+1) k secret integers $D_{1J} = [d_{j0}, f_{j1}, f_{j2}, ..., f_{jm}]$ (for j = 1, ..., k) stored in said main unit and m×k public integers $D_{2j} = [d_{j1}, d_{j2}, ..., d_{jm}]$ (j = 1, ..., k)

which satisfy the following k sets of equations $$d \equiv d_{j0} + f_{j1} \cdot d_{j1} + f_{j2} \cdot d_{j2} + ... + f_{jm} \cdot d_{jm} \pmod{\lambda(n_j)}$$

where j = 1, ..., k and $\lambda(n_j)$ is the Carmichael function of said positive integer $n_j$;

(c) computing in said auxiliary unit $Y_{ji} = M^{d_{ji}} \mod n$ where i = 1, ..., m and j = 1, ..., k and sending the results to said main unit; and (d) computing in said main unit the following k values $S_j$ using $Y_{j0} = M^{d_{j0}} \mod n$ and $Y_{ji}$ which have been computed by said main unit;

$$S_j \equiv Y_{j0} \cdot Y_{j1}^{f_{j1}} \cdot Y_{j2}^{f_{j2}} ... Y_{jm}^{f_{jm}} \mod n_j$$

where j = 1, ...k and (e) obtaining a result S which satisfies the k simultaneous equations concerning S as follows:

$$S_j = S \mod n_j \text{ (for } j = 1, ..., k) .$$

5. The server-aided computation method of claim 4 wherein said integer n is a prime number.

6. The server-aided computation method of claim 4 wherein said integer is a product of two prime numbers.

7. The server-aided computation method of claim 4 wherein each of m×k non-negative integers $f_{j1}, f_{j2}, ..., f_{jm}$ is 1 or 0.

8. The sever-aided computation method of claim 4 wherein values $d_{ij}$ are defined so that they satisfy a condition $d_{ij} = d_{uv}$ at least for one set of integer pairs (i, j) and (u, v) where i, j, u and v are arbitrary subscripts.

9. A distributed information processing unit having a main unit for storing secret information and at least one auxiliary unit for supporting a transformation that said main unit executes, for executing a distributed process without disclosing said secret information necessary for said transformation to other than said main unit, said distributed information processing unit comprising:

transformation means for transforming input information inverse transformation means for inversely transforming the transformation results; and verification means for comparing the inverse transformation results of said inverse transformation means with said input information so as to verify the transformation results of said transformation means, said main unit having said verification means.

10. A distributed information processing unit having a main unit for storing secret information and at least one auxiliary unit for supporting a transformation that said main unit executes, for executing a distributed process without disclosing said secret information necessary for said transformation to other than said main unit, said distributed information processing unit comprising:

a plurality of transformation means for executing said transformation of input information; and verification means for mutually comparing the transformation results of said plurality of transformation means, said main unit having said verification means.

11. The distributed information processing unit of claim 9 wherein said secret information is not disclosed to said auxiliary unit and distributively processed in said main unit and said auxiliary unit.

12. A distributed information processing unit having a main unit for storing secret information and at least one auxiliary unit for supporting a transformation that said main unit executes, for executing a distributed process without disclosing said secret information necessary for said transformation to other than said main unit, said distributed information processing unit comprising:

first transformation means for executing said transformation of input information;

second transformation means for executing an identity transformation; and comparison means for comparing the transformation results of said second transformation means with said input information so as to verify the transformation results of said first transformation means, said main unit having said comparison means.

* * * * *

UNITED STATES PATENT AND TRADEMARK OFFICE
CERTIFICATE OF CORRECTION

PATENT NO. : 5,046,094
DATED : September 3, 1991
INVENTOR(S) : Shinichi Kawamura et al.

It is certified that error appears in the above-identified patent and that said Letters Patent is hereby corrected as shown below:

On Title page, item [75]
The third inventor's name is incorrect, should be, --Kyoko Takabayashi--.

Signed and Sealed this

Ninth Day of March, 1993

*Attest:*

STEPHEN G. KUNIN

*Attesting Officer*  *Acting Commissioner of Patents and Trademarks*